(12) United States Patent
Kabasawa et al.

(10) Patent No.: US 11,390,130 B2
(45) Date of Patent: Jul. 19, 2022

(54) VEHICLE POSTURE CONTROL APPARATUS BASED ON ACCELERATION DETECTION SIGNALS

(71) Applicant: SONY CORPORATION, Tokyo (JP)

(72) Inventors: Hidetoshi Kabasawa, Kanagawa (JP); Kosei Yamashita, Kanagawa (JP); Sho Murakoshi, Tokyo (JP); Tomohiro Matsumoto, Kanagawa (JP); Masahiro Segami, Kanagawa (JP)

(73) Assignee: SONY CORPORATION, Tokyo (JP)

(*) Notice: Subject to any disclaimer, the term of this patent is extended or adjusted under 35 U.S.C. 154(b) by 303 days.

(21) Appl. No.: 16/463,795

(22) PCT Filed: Jan. 10, 2018

(86) PCT No.: PCT/JP2018/000341
§ 371 (c)(1),
(2) Date: May 23, 2019

(87) PCT Pub. No.: WO2018/135355
PCT Pub. Date: Jul. 26, 2018

(65) Prior Publication Data
US 2019/0308481 A1 Oct. 10, 2019

(30) Foreign Application Priority Data

Jan. 19, 2017 (JP) .............................. JP2017-007396

(51) Int. Cl.
*B60G 17/016* (2006.01)
*B60K 28/16* (2006.01)
(Continued)

(52) U.S. Cl.
CPC ....... *B60G 17/0164* (2013.01); *B60G 17/015* (2013.01); *B60G 17/016* (2013.01);
(Continued)

(58) Field of Classification Search
CPC ............. B60G 17/0164; B60G 17/015; B60G 17/016; G01P 15/09; G01P 15/0922;
(Continued)

(56) References Cited

U.S. PATENT DOCUMENTS

| 11,003,054 B2* | 5/2021 | Kabasawa ............... G01P 15/09 |
| 2003/0195689 A1* | 10/2003 | Mori .................... G01M 17/007 701/1 |

(Continued)

FOREIGN PATENT DOCUMENTS

| JP | 07-285311 A | 10/1995 |
| JP | 2011-047879 A | 3/2011 |

(Continued)

OTHER PUBLICATIONS

English translation of Hattori (WO 2005088106) (Year: 2005).*

(Continued)

*Primary Examiner* — James M McPherson
*Assistant Examiner* — Kyle J Kingsland
(74) *Attorney, Agent, or Firm* — Chip Law Group

(57) ABSTRACT

A vehicle control apparatus according to an embodiment of the present technology includes a control unit. The control unit generates a control signal for controlling behavior of a vehicle body on a basis of a first acceleration detection signal and a second acceleration detection signal, the first acceleration detection signal including information relating to an acceleration acting on the vehicle body, the first acceleration detection signal having an alternating current waveform corresponding to the acceleration, the second acceleration detection signal including information relating to the acceleration, the second acceleration detection signal having an output waveform, an alternating current component corresponding to the acceleration being superimposed on a direct current component in the output waveform.

10 Claims, 17 Drawing Sheets

(51) Int. Cl.
*B60W 40/107* (2012.01)
*B60W 40/109* (2012.01)
*B60W 40/11* (2012.01)
*B60W 40/112* (2012.01)
*G01P 15/09* (2006.01)
*G01P 15/125* (2006.01)
*G01P 15/18* (2013.01)
*B60G 17/015* (2006.01)

(52) U.S. Cl.
CPC ........... *B60K 28/16* (2013.01); *B60W 40/107* (2013.01); *B60W 40/109* (2013.01); *B60W 40/11* (2013.01); *B60W 40/112* (2013.01); *G01P 15/09* (2013.01); *G01P 15/0922* (2013.01); *G01P 15/125* (2013.01); *G01P 15/18* (2013.01); *B60W 2520/105* (2013.01); *B60W 2520/125* (2013.01); *B60W 2520/16* (2013.01); *B60W 2520/18* (2013.01); *B60W 2710/223* (2013.01); *B60W 2720/26* (2013.01)

(58) Field of Classification Search
CPC ....... G01P 15/125; G01P 15/18; B60K 28/16; B60W 40/107; B60W 40/109; B60W 40/11; B60W 40/112; B60W 2520/105; B60W 2520/125; B60W 2520/16; B60W 2520/18; B60W 2710/223; B60W 2720/26
See application file for complete search history.

(56) References Cited

U.S. PATENT DOCUMENTS

| | | | |
|---|---|---|---|
| 2011/0054831 A1 | 3/2011 | Fujiwara | |
| 2011/0202225 A1 | 8/2011 | Willis et al. | |
| 2019/0265034 A1* | 8/2019 | Kabasawa | G01P 15/125 |
| 2019/0265269 A1* | 8/2019 | Yamashita | G01P 3/44 |
| 2019/0265270 A1* | 8/2019 | Yamashita | G01P 15/18 |
| 2019/0360809 A1* | 11/2019 | Kabasawa | G01P 15/123 |
| 2019/0391598 A1* | 12/2019 | Murakoshi | G05D 1/0808 |
| 2020/0041877 A1* | 2/2020 | Murakoshi | G01P 15/18 |

FOREIGN PATENT DOCUMENTS

| | | | |
|---|---|---|---|
| JP | 2015-184207 A | 10/2015 | |
| JP | 2016-053323 A | 4/2016 | |
| WO | WO-2005088106 A1 * | 9/2005 | G01P 15/18 |
| WO | 2015/146045 A1 | 10/2015 | |

OTHER PUBLICATIONS

International Search Report and Written Opinion of PCT Application No. PCT/JP2018/000341, dated Apr. 3, 2018, 07 pages of ISRWO.

* cited by examiner

VEHICLE POSTURE CONTROL APPARATUS BASED ON ACCELERATION DETECTION SIGNALS

CROSS REFERENCE TO RELATED APPLICATIONS

This application is a U.S. National Phase of International Patent Application No. PCT/JP2018/000341 filed on Jan. 10, 2018, which claims priority benefit of Japanese Patent Application No. JP 2017-007396 filed in the Japan Patent Office on Jan. 19, 2017. Each of the above-referenced applications is hereby incorporated herein by reference in its entirety.

TECHNICAL FIELD

The present technology relates to a vehicle control apparatus for controlling behavior of a vehicle body during travelling.

BACKGROUND ART

In recent years, there has been known a technology for controlling posture of a vehicle body of a travelling vehicle by a suspension control apparatus or controlling drive slip of a drive wheel by a traction control apparatus in order to stabilize behavior of the vehicle body.

For example, Patent Literature 1 discloses a technology for controlling damping of a suspension by a hydraulic cylinder on the basis of output of a vertical acceleration detection means that detects vibration of a vehicle body. Further, Patent Literature 2 discloses a technology for changing a slip value that is a threshold value of turning on/off traction control on the basis of output of a yaw rate detection unit that detects a yaw rate of a two-wheel vehicle or changing the suppression amount of driving force in the traction control on the basis of the detected yaw rate.

CITATION LIST

Patent Literature

Patent Literature 1: Japanese Patent Application Laid-open No. 1995-285311
Patent Literature 2: Japanese Patent Application Laid-open No. 2016-53323

DISCLOSURE OF INVENTION

Technical Problem

However, it is difficult to correctly distinguish, when travelling on a rough road where rolling and pitching are repeated violently while crossing the road surface gap, on a winding road, or the like, whether the detected acceleration is the lateral acceleration of the original motion acceleration or the longitudinal acceleration due to the road surface gap. Therefore, it is difficult to properly execute posture control or drive slip control based on the detected acceleration, yaw rate, and the like in some cases.

In view of the circumstances as described above, it is an object of the present technology to provide a vehicle control apparatus that makes it possible to perform proper behavior control of a vehicle body by detecting the lateral acceleration and the longitudinal acceleration with high precision.

Solution to Problem

A vehicle control apparatus according to an embodiment of the present technology includes a control unit.

The control unit generates a control signal for controlling behavior of a vehicle body on a basis of a first acceleration detection signal and a second acceleration detection signal, the first acceleration detection signal including information relating to an acceleration acting on the vehicle body, the first acceleration detection signal having an alternating current waveform corresponding to the acceleration, the second acceleration detection signal including information relating to the acceleration, the second acceleration detection signal having an output waveform, an alternating current component corresponding to the acceleration being superimposed on a direct current component in the output waveform.

In the vehicle control apparatus, the control unit extracts a dynamic acceleration component and a static acceleration component from the acceleration on a basis of the first acceleration detection signal and the second acceleration detection signal. As a result, it is possible to realize appropriate behavior control of a vehicle body by separating the acceleration component corresponding to the gravitational acceleration from the acceleration acting on the vehicle body.

The control unit may include an acceleration calculation unit and a signal generation circuit.

The acceleration calculation unit extracts a dynamic acceleration component and a static acceleration component acting on the vehicle body on a basis of the first acceleration detection signal and the second acceleration detection signal.

The signal generation circuit generates the control signal on a basis of an angular velocity signal, the dynamic acceleration component, and the static acceleration component, the angular velocity signal including information relating to at least one of an angular velocity in a roll direction acting on the vehicle body or an angular velocity in a pitch direction acting on the vehicle body.

The signal generation circuit may output, as the control signal, a control command to a suspension control apparatus that suppresses a posture change of the vehicle body.

As a result, it is possible to perform stable posture control of the vehicle body such as a four-wheel vehicle, and improve the ride quality.

Alternatively, the signal generation circuit may output, as the control signal, a control command to a traction control apparatus that controls driving force of a drive wheel.

As a result, it is possible to perform stable traction control of two-wheel vehicles and the like, and prevent falling due to drive slip.

The acceleration calculation unit may include a calculation circuit that extracts the static acceleration component from the acceleration on a basis of a difference signal between the first acceleration detection signal and the second acceleration detection signal.

Further, the acceleration calculation unit may further include a gain adjustment circuit that adjusts gain of each signal so that the first acceleration detection signal and the second acceleration detection signal are at the same level.

The acceleration calculation unit may further include a correction circuit that computes a correction coefficient on a basis of the difference signal and corrects one of the first acceleration detection signal and the second acceleration detection signal using the correction coefficient.

The vehicle control apparatus may further include a detection unit.

The detection unit includes a movable portion, a piezoelectric first acceleration detection unit, and a non-piezoelectric second acceleration detection unit, the movable portion being movable upon receiving an acceleration, the piezoelectric first acceleration detection unit being provided on the movable portion to output the first acceleration detection signal, the non-piezoelectric second acceleration detection unit being provided on the movable portion to output the second acceleration detection signal.

The second acceleration detection unit may include a piezoresistive acceleration detection device.

Alternatively, the second acceleration detection unit may include a capacitive acceleration detection device.

Advantageous Effects of Invention

As described above, in accordance with the present technology, it is possible to realize proper behavior control of a vehicle body by detecting the lateral acceleration and the longitudinal acceleration of the vehicle body with high precision.

It should be noted that the effect described here is not necessarily limitative and may be any effect described in the present disclosure.

MODE(S) FOR CARRYING OUT THE INVENTION

Hereinafter, embodiments according to the present technology will be described with reference to the drawings.

First Embodiment

Figure 1:
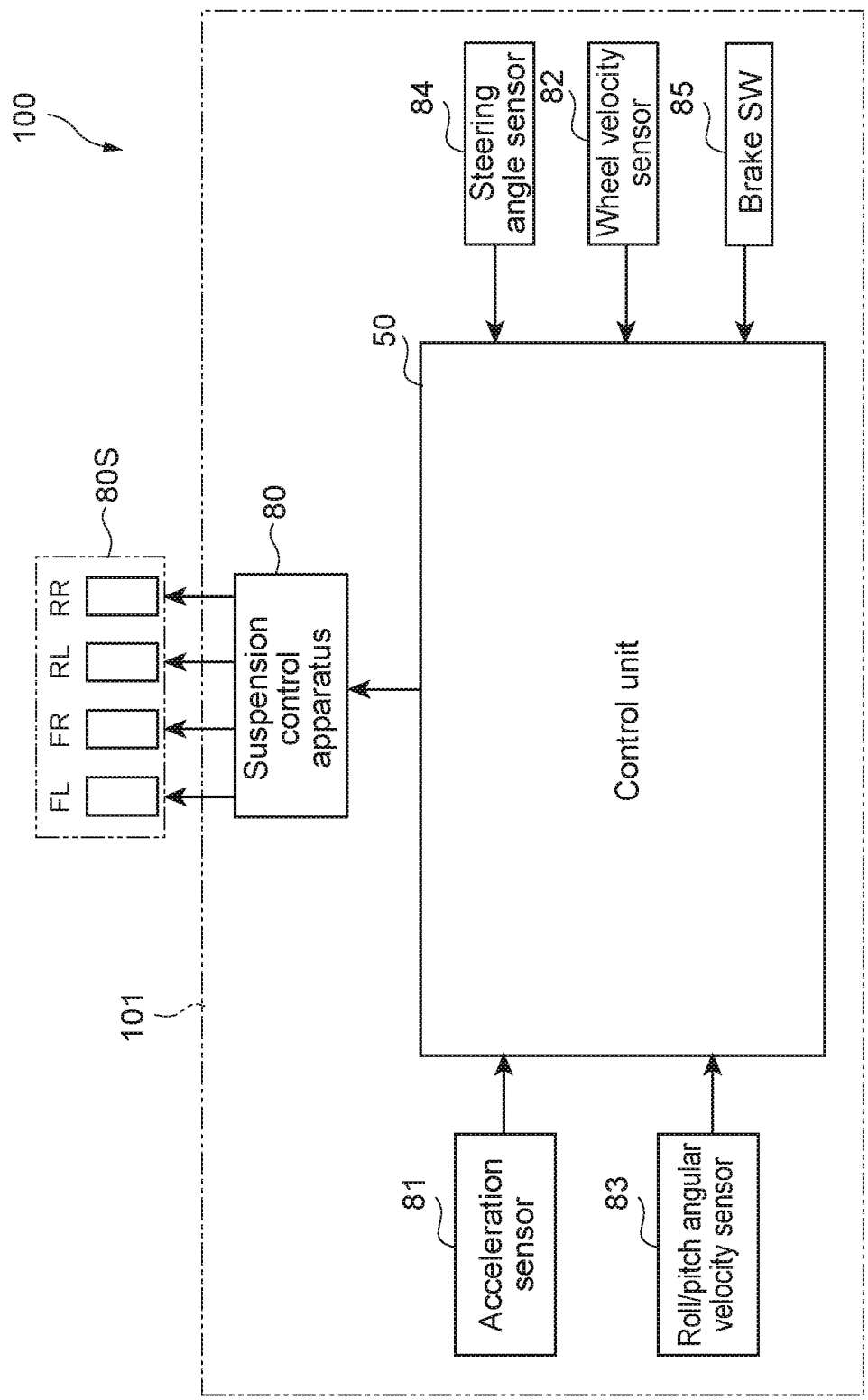
FIG. 1 is a schematic configuration diagram showing a vehicle control apparatus according to an embodiment of the present technology.

FIG. 1 is a block diagram showing a configuration of the main part of a vehicle 100 equipped with a vehicle control apparatus according to a first embodiment of the present technology. In this embodiment, a case where the vehicle 100 is a four-wheel vehicle will be described as an example.

[Schematic Configuration]

As shown in FIG. 1, the vehicle 100 includes a suspension control apparatus 80, and a control unit 50 that generates a control signal for the suspension control apparatus 80.

The suspension control apparatus 80 includes an electronic control unit (ECU) for adjusting the damping force (damping amount) of vibration with respect to dampers (fluid pressure cylinders) 80S for vibration damping interposed between a vehicle body 101 and wheels (FL, FR, RL, and RR) to stably keep the posture or behavior of a vehicle body. The suspension control apparatus 80 typically controls the damping amount of the dampers 80S of the left and right front wheels (FL, FR) and left and right rear wheels (RL, RR) independently, but may perform control commonly for the left and right rear wheels.

The control unit 50 is mounted on the vehicle body 101. The control unit 50 acquires information relating to the acceleration and angular velocity in the three-axis directions of the vehicle body, which changes from moment to moment, on the basis of detection signals of the acceleration, angular velocity, and the like acting on the vehicle body 101, generates a control signal for controlling behavior of the vehicle body 101, and output it to the suspension control apparatus 80. Note that the control unit 50 may be configured as a part of the suspension control apparatus 80.

The control unit 50 is configured to be supplied with output of various sensors including an acceleration sensor 81, a wheel velocity sensor 82, an angular velocity sensor 83, a steering angle sensor 84, a brake switch 85, and the like.

The acceleration sensor 81 includes an acceleration sensor device 10 (FIG. 2) that detects accelerations in the three-axis directions (up-and-down direction, front-and-rear direction, and right-and-left direction) including the direction of gravity acting on the vehicle body 101 and the direction intersecting with this. The acceleration sensor 81 may further include a sensor device that detects a sprung acceleration, an unsprung acceleration, or the like of each wheel. The angular velocity sensor 83 detects the angular velocities in the roll direction and pitch direction of the vehicle body 101 but may be configured to further detect the angular velocity in the yaw direction.

The acceleration sensor 81 and the angular velocity sensor 83 may each include a plurality of single-axis sensors having different detection axes, or a multi-axis sensor capable of simultaneously detecting multi-axis directions. Note that details of the acceleration sensor 81 will be described later.

The wheel velocity sensor 82 detects the rotational velocity of each wheel. The output of the wheel velocity sensor 82 is used for, for example, computing the slip ratio of each wheel or the velocity of the vehicle body. The steering angle sensor 84 detects the steering angle of a steering. The output of the steering angle sensor 84 is referred to by, for example, roll control or the like of the vehicle body at the time of cornering. The brake switch 85 detects the presence or absence of the operation of a brake pedal. The output of the brake switch 85 is referred to by, for example, anti-skid control or drive slip control (traction control) of the wheel.

The control unit 50 constitutes the vehicle control apparatus according to this embodiment. However, also the acceleration sensor 81 and the angular velocity sensor 83 may be configured as a part of the vehicle control apparatus. When generating a control command to the suspension control apparatus 80, output of each of the wheel velocity sensor 82, the steering angle sensor 84, and the brake switch 85 may be omitted as necessary.

[Vehicle Control Apparatus]

Figure 2:
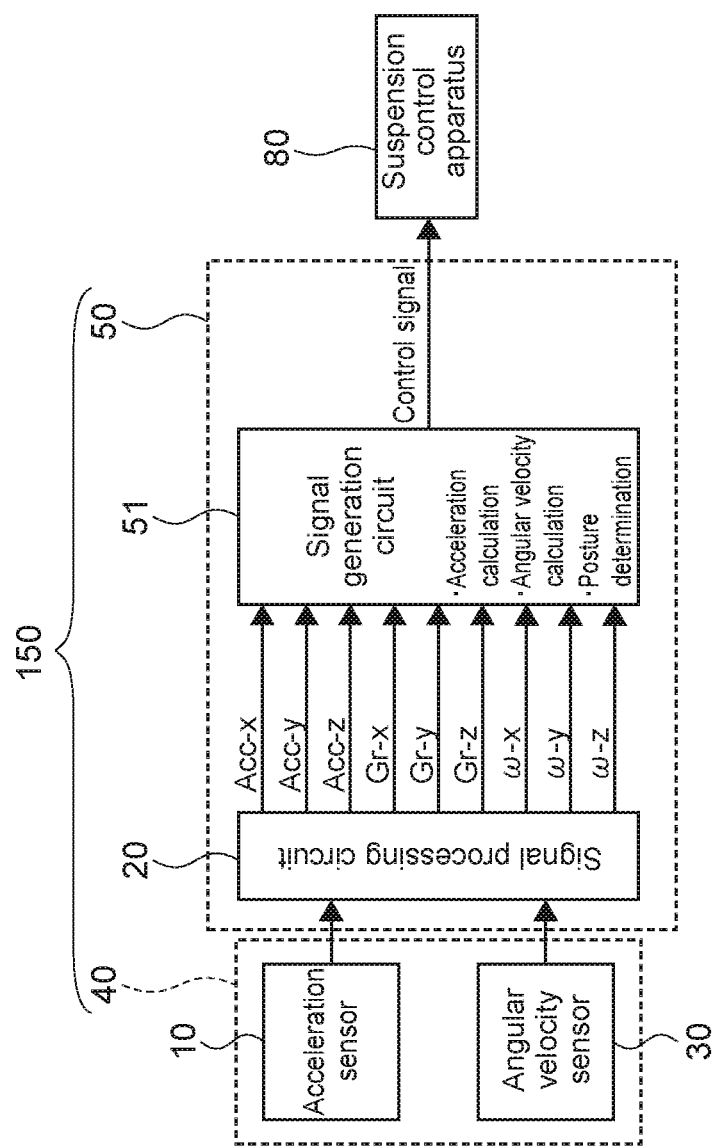
FIG. 2 is a block diagram showing a configuration of the vehicle control apparatus.

Subsequently, details of the vehicle control apparatus will be described. FIG. 2 is a block diagram showing a configuration of a vehicle control apparatus 150 according to this embodiment.

The vehicle control apparatus 150 includes a detection unit 40 and the control unit 50.

The detection unit 40 includes the acceleration sensor device 10 and an angular velocity sensor device 30. The acceleration sensor device 10 corresponds to the acceleration sensor 81 in FIG. 1, and detects accelerations in the three-axis directions (x, y, and z axes in FIG. 3) orthogonal to each other. The angular velocity sensor device 30 corresponds to the angular velocity sensor 83 in FIG. 1, and detects the angular velocity around the above-mentioned three axes.

In the detection unit 40, the acceleration sensor and the angular velocity sensor for each axis may be individually configured, or may each include a single sensor capable of simultaneously detecting the accelerations and the angular velocities in the three-axis directions. Further, it does not necessarily need to provide the angular velocity sensor device 30, and the acceleration sensor device 10 may be used for detecting the angular velocity.

As will be described later, the acceleration sensor device 10 outputs a first acceleration detection signal and a second acceleration detection signal. The first acceleration detection signal includes information relating to the acceleration acting on the vehicle body 101, and has an alternating current waveform corresponding to the above-mentioned acceleration. The second acceleration detection signal includes information relating to the above-mentioned acceleration, and has an output waveform in which an alternating current component corresponding to the above-mentioned acceleration is superimposed on a direct current component.

The control unit 50 includes a signal processing circuit 20 and a signal generation circuit 51.

The signal processing circuit 20 typically includes a computer including a CPU/MPU and a memory. The signal processing circuit 20 computes dynamic acceleration components (Acc-x, Acc-y, and Acc-z), static acceleration components (Gr-x, Gr-y, and Gr-z), and angular velocity signals ($\omega$-x, $\omega$-y, and $\omega$-z) of the vehicle body 101 acquired at a predetermined sampling period, on the basis of the output signal of the detection unit 40, and sequentially outputs them to the signal generation circuit 51.

The dynamic acceleration components (Acc-x, Acc-y, and Acc-z) and the static acceleration components (Gr-x, Gr-y, and Gr-z) in the three-axis directions are separated by the signal processing circuit 20 on the basis of the first and second acceleration detection signals output from the acceleration sensor device 10.

The signal processing circuit 20 computes each of the angular velocity signals ($\omega$-x, $\omega$-y, and $\omega$-z) around the three axes on the basis of the angular velocity detection signals around the three axes of the vehicle body 101 detected by the angular velocity sensor device 30. The angular velocity sensor device 30 detects each of the angular velocities around the x, y, and z axes. As the angular velocity sensor device 30, a vibration type gyro sensor is typically used. Other than this, a rotation top gyro sensor, a laser ring gyro sensor, a gas rate gyro sensor, or the like may be used.

The signal generation circuit 51 typically includes a computer including a CPU/MPU and a memory. The signal generation circuit 51 determines the posture or the vibration state of the vehicle body 101 on the basis of the dynamic acceleration components and the static acceleration components of the vehicle body 101 extracted in the signal processing circuit 20. The signal generation circuit 51 generates, on the basis of the output of the signal processing circuit 20, a control signal for controlling behavior of the vehicle body 101, and outputs it to the suspension control apparatus 80.

(Acceleration Sensor Device)

Subsequently, details of the acceleration sensor device 10 constituting the detection unit 40 will be described.

Figure 3:
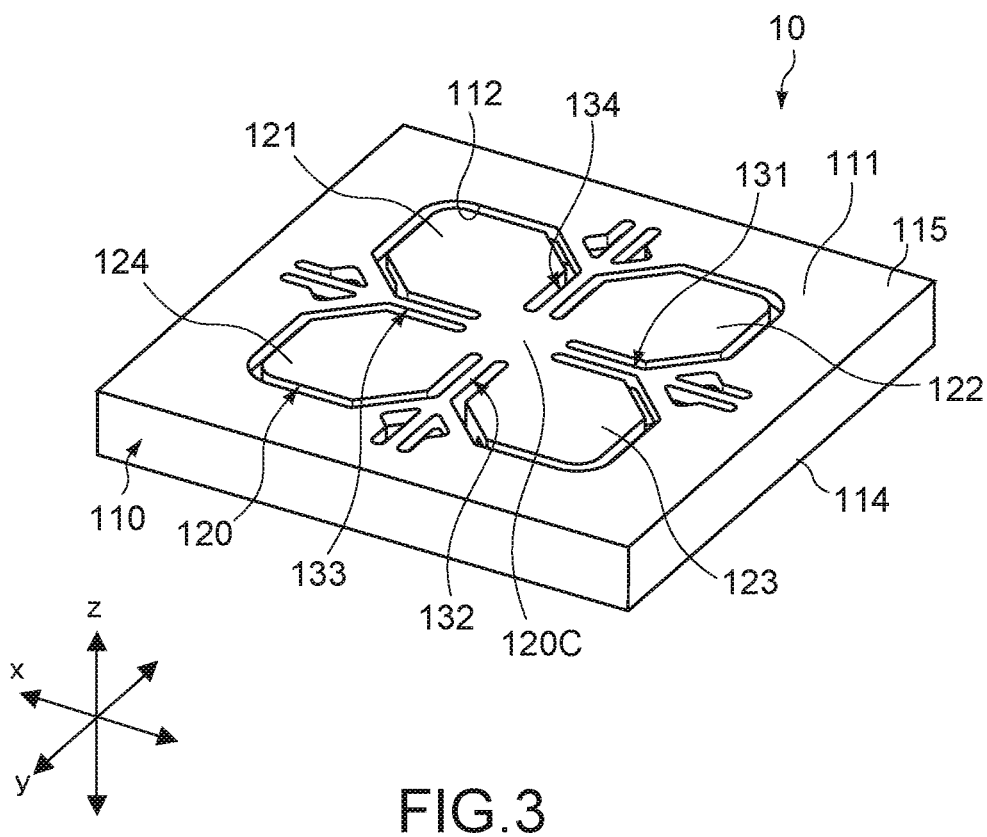
FIG. 3 is a perspective view on the front surface side schematically showing a configuration of an acceleration sensor device constituting a detection unit in the vehicle control apparatus.
Figure 4:
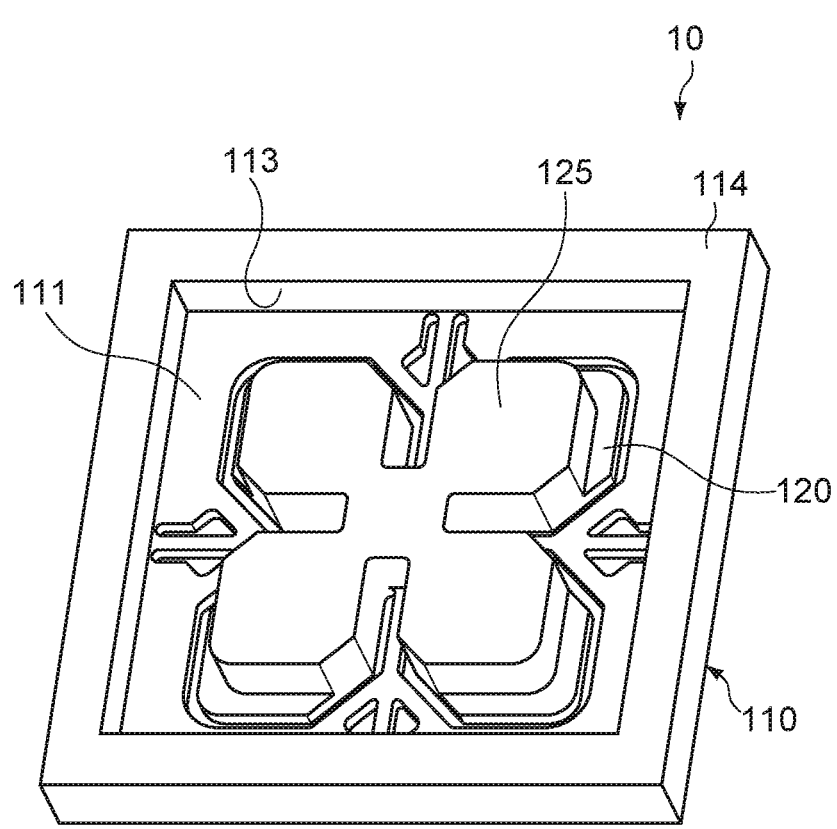
FIG. 4 is a perspective view on the rear surface side of the acceleration sensor device.
Figure 5:
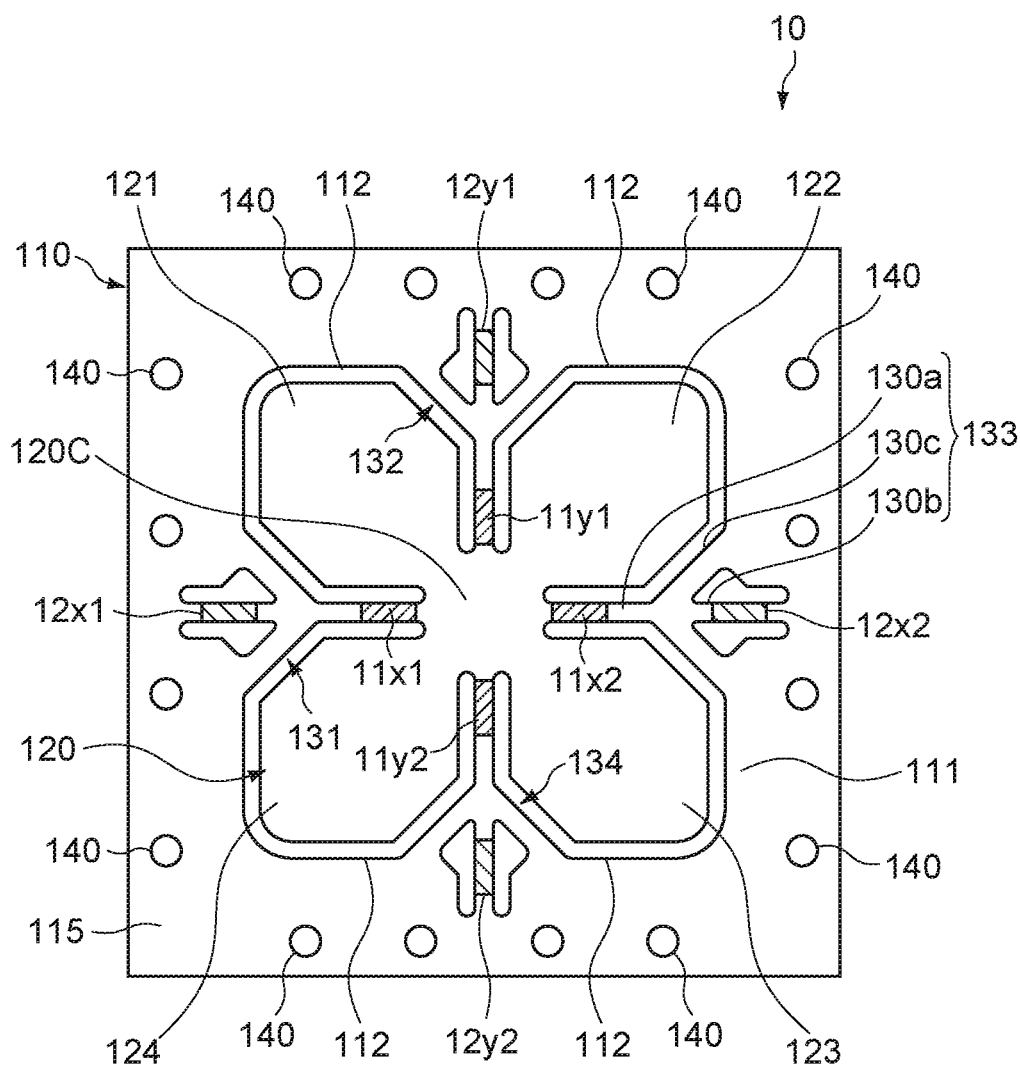
FIG. 5 is a plan view on the front surface side of the acceleration sensor device.

FIG. 3 to FIG. 5 are respectively a perspective view on the front surface side, a perspective view on the rear surface, and a plan view on the front surface side schematically showing a configuration of the acceleration sensor device 10.

In FIG. 3 and FIG. 5, the x axis, the y axis, and the z axis indicate three-axis directions orthogonal to each other, and the z-axis direction corresponds to the thickness direction (height direction) of the acceleration sensor device 10. Typically, the acceleration sensor device 10 is mounted in the vehicle body 101 so that the axes (x, y, and z axes) of the acceleration sensor device 10 respectively correspond to the three-axis (right-and-left, front-and-rear, and up-and-down) directions of the vehicle body 101. It goes without saying that the present technology is not limited thereto.

The mounting place, number, and the like of the acceleration sensor device 10 are not particularly limited, and one acceleration sensor device 10 is installed at the center position of the vehicle body 101, for example. Further, by using a plurality of acceleration sensor devices 10, it is possible to detect sprung accelerations of all wheels or any plurality of wheels.

The acceleration sensor device 10 includes a device body 110, a first acceleration detection unit 11 (first detection devices 11x1, 11x2, 11y1, and 11y2) and a second acceleration detection unit 12 (second detection devices 12x1, 12x2, 12y1, and 12y2).

The device body 110 includes a main surface portion 111 in parallel with the xy plane and a support portion 114 on the opposite side. The device body 110 typically includes an SOI (Silicon On InsUlator) substrate, and has a layered structure of an active layer (silicon substrate) forming the main surface portion 111 and a frame-like support layer (silicon substrate) forming the support portion 114. The main surface portion 111 and the support portion 114 have different thicknesses, and the support portion 114 is formed to be thicker than the main surface portion 111.

The device body 110 includes a movable plate 120 (movable portion) capable of moving in response to an acceleration. The movable plate 120 is provided at the center portion of the main surface portion 111, and formed by processing the above-mentioned active layer forming the main surface portion 111 into a predetermined shape. More specifically, a plurality of groove portions 112 formed in the main surface portion 111 form the movable plate 120 including a plurality of (in this example, four) blade portions 121 to 124 having a symmetrical shape with respect to the center position of the main surface portion 111. The peripheral portion of the main surface portion 111 constitutes a base portion 115 opposed to the support portion 114 in the z-axis direction.

As shown in FIG. 4, the support portion 114 is formed in a frame shape including a rectangular recess 113 that opens the rear surface of the movable plate 120. The support portion 114 is configured as a bonding surface to be bonded to a support substrate (not shown). The above-mentioned support substrate may include a circuit substrate that electrically connects the sensor device 10 and the signal processing circuit 20, or a relay substrate or package substrate to be electrically connected to the circuit substrate. Alternatively, the support portion 114 may be provided with a plurality of external connection terminals to be electrically connected to the relay substrate or package substrate.

The blade portions 121 to 124 of the movable plate 120 each include a plate piece having a predetermined shape (in this example, a substantially hexagonal shape), and are arranged at intervals of 90° around a central axis in parallel with the z axis. The thickness of each of the blade portions 121 to 124 corresponds to the thickness of the above-mentioned active layer constituting the main surface portion 111. The blade portions 121 to 124 are integrally connected to each other at a center portion 120C of the movable plate 120, and integrally supported so as to be movable relative to the base portion 115.

As shown in FIG. 4, the movable plate 120 further includes a weight portion 125. The weight portion 125 is integrally provided on the rear surface of the center portion of the movable plate 120 and the rear surface of each of the blade portions 121 to 124. The size, thickness, and the like of the weight portion 125 are not particularly limited, and are set to appropriate magnitudes at which desired vibration characteristics of the movable plate 120 can be achieved. The weight portion 125 is formed by, for example, processing the above-mentioned layer forming the support portion 114 into a predetermined shape.

As shown in FIG. 3 and FIG. 5, the movable plate 120 is connected to the base portion 115 via a plurality of (in this example, four) bridge portions 131 to 134. The plurality of bridge portions 131 to 134 are provided between the blade portions 121 to 124, and formed by processing the above-mentioned active layer forming the main surface portion 111 into a predetermined shape. The bridge portion 131 and the bridge portion 133 are disposed to face each other in the x-axis direction, and the bridge portion 132 and the bridge portion 134 are disposed to face each other in the y-axis direction.

The bridge portions 131 to 134 constitute a part of the movable portion capable of moving relative to the base portion 115, and elastically support the center portion 120C of the movable plate 120. The bridge portions 131 to 134 have the same configuration, and each include a first beam portion 130a, a second beam portion 130b, and a third beam portion 130c, as shown in FIG. 5.

The first beam portion 130a linearly extends from the peripheral portion of the center portion 120C of the movable plate 120 in the x-axis direction or in the y-axis direction, and is disposed between corresponding adjacent blade portions of the blade portions 121 to 124. The second beam portion 130b linearly extends in the x-axis direction or in the y-axis direction, and connects the first beam portion 130a and the base portion 115.

The third beam portion 130c linearly extends in a direction intersecting the x-axis direction or the y-axis direction, and connects an intermediate portion between the first beam portion 130a and the second beam portion 130b, and the base portion 115. Each of the bridge portions 131 to 134 includes two third beam portions 130c, and is configured so that the two third beam portions 130c in the xy plane sandwich one second beam portion 130b.

The rigidity of each of the bridge portions 131 to 134 is set to an appropriate value that is capable of stably supporting the movable plate 120 that moves. In particular, the rigidity of each of the bridge portions 131 to 134 is set to an appropriate rigidity at which it can be deformed by the weight of the movable plate 120, and the magnitude of the deformation is not particularly limited as long as it can be detected by the second acceleration detection unit 12 described below.

As described above, the movable plate 120 is supported by the base portion 115 of the device body 110 via the four bridge portions 131 to 134, and configured to be capable of moving relative to the base portion 115 with the bridge portions 131 to 134 as fulcrums by the inertia force corresponding to the acceleration.

Figure 6A:
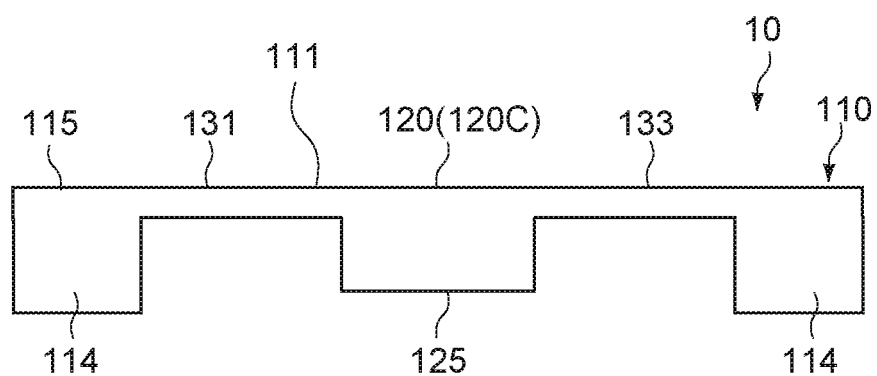
FIG. 6A is a schematic side cross-sectional view describing a state of motion of the main part of the acceleration sensor device, and shows the time when no acceleration is applied.
Figure 6B:
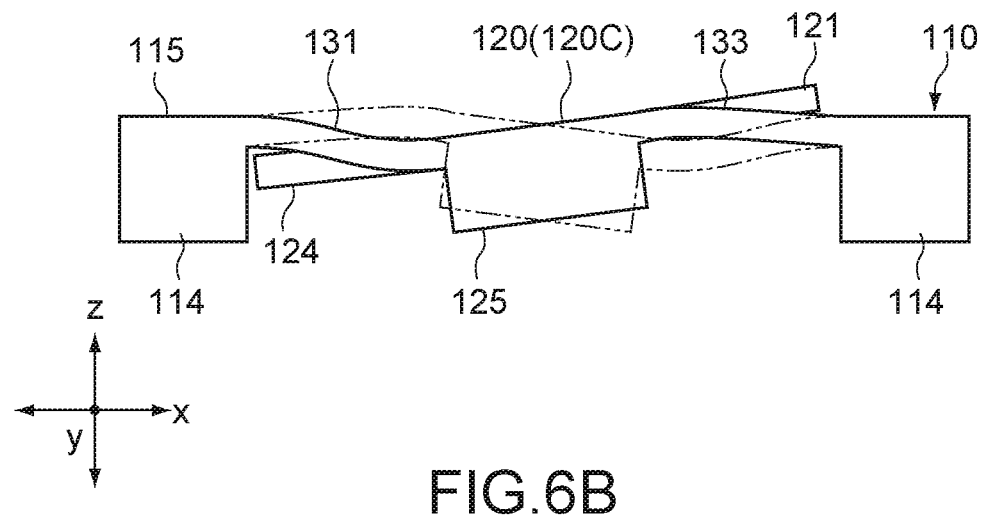
FIG. 6B is a schematic side cross-sectional view describing a state of motion of the main part of the acceleration sensor device, and shows the time when an acceleration along an x-axis direction is generated.
Figure 6C:
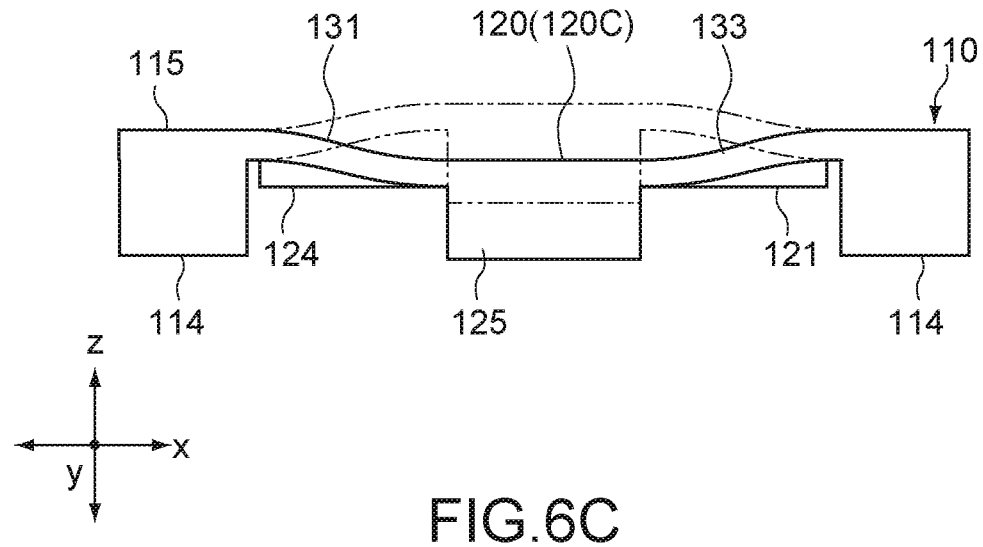
FIG. 6C is a schematic side cross-sectional view describing a state of motion of the main part of the acceleration sensor device, and shows the time when an acceleration along a z-axis direction is generated.

FIGS. 6A to 6C are each a schematic side cross-sectional view describing a state of motion of the movable plate 120. FIG. 6A shows the time when no acceleration is applied, FIG. 6B shows the time when an acceleration along the x-axis direction is generated, and FIG. 6C shows the time when an acceleration along the z-axis direction is generated. Note that a solid line in FIG. 6B shows the state where an acceleration is generated in the left direction of the drawing, and a solid line in FIG. 6C shows the state where an acceleration is generated in the upper direction of the drawing.

In the case where no acceleration is generated, the movable plate 120 is kept parallel to the front surface of the base portion 115 as shown in FIG. 3 and FIG. 6A. In the case where an acceleration along the x-axis direction is generated in this state, for example, the movable plate 120 is inclined counterclockwise about the bridge portions 132 and 134 that extend in the y-axis direction as shown in FIG. 6B. As a result, the bridge portions 131 and 133 facing each other in the x-axis direction receive bending stress in opposite directions along in the z-axis direction.

Similarly, in the case where an acceleration along the y-axis direction is generated, the movable plate 120 is inclined counterclockwise (or clockwise) about the bridge portions 131 and 133 extending in the x-axis direction, and the bridge portions 132 and 134 facing each other in the y-axis direction receive bending stress in opposite direction along the z-axis direction, although not shown.

Meanwhile, in the case where an acceleration along the z-axis direction is generated, the movable plate 120 moves up and down relative to the base portion 115 as shown in FIG. 6C, and each of the bridge portions 131 to 134 receives bending stress in the same direction along the z-axis direction.

The first acceleration detection unit 11 and the second acceleration detection unit 12 are provided in each of the bridge portions 131 to 134. The detection unit (inertial sensor) 40 measures the orientation and magnitude of the acceleration acting on the sensor device 10 by detecting deformation of the bridge portions 131 to 134 due to the bending stress by the acceleration detection units 11 and 12.

Hereinafter, details of the acceleration detection units 11 and 12 will be described.

As shown in FIG. 5, the first acceleration detection unit 11 include the plurality of (in this example, four) first detection devices 11$x$1, 11$x$2, 11$y$1, and 11$y$2.

The detection devices 11$x$1 and 11$x$2 are provided on the axial centers of the front surfaces of the two bridge portions 131 and 133 facing each other in the x-axis direction. One detection device 11$x$1 is disposed on the first beam portion 130$a$ of the bridge portion 131, and the other detection device 11$x$2 is disposed on the first beam portion 130$a$ of the bridge portion 133. Meanwhile, the detection devices 11$y$1 and 11$y$2 are provided on the axial centers of the front surfaces of the two bridge portions 132 and 134 facing each other in the y-axis direction. One detection device 11$y$1 is disposed on the first beam portion 130$a$ of the bridge portion 132, and the other detection device 11$y$2 is disposed on the first beam portion 130$a$ of the bridge portion 134.

The first detection devices 11$x$1 to 11$y$2 have the same configuration, and each includes a rectangular piezoelectric detection device having the long side in the axial center direction of the first beam portion 130$a$ in this embodiment. The first detection devices 11$x$1 to 11$y$2 each include a laminate of a lower electrode layer, a piezoelectric film, and an upper electrode layer.

The piezoelectric film is typically formed of lead zirconate titanate (PZT). It goes without saying that the present technology is not limited thereto. The piezoelectric film generates a potential difference corresponding to the amount of bending deformation (stress) of the first beam portion 130$a$ in the z-axis direction between the upper electrode layer and the lower electrode layer (piezoelectric effect). The upper electrode layer is electrically connected to relay terminals 140 provided on the front surface of the base portion 115 via wiring layers (not shown) formed on the bridge portions 131 to 134. The relay terminals 140 may each be configured as an external connection terminal to be electrically connected to the above-mentioned support substrate. For example, one end of bonding wire whose other end is connected to the above-mentioned support substrate is connected thereto. The lower electrode layer is typically connected to a reference potential such as a ground potential.

Since the first acceleration detection unit 11 configured as described above performs output only when the stress changes due to the characteristics of the piezoelectric film and does not perform output in the state where the stress value does not change even in the case where stress is applied, the first acceleration detection unit 11 mainly detects the magnitude of the motion acceleration acting on the movable plate 120. Therefore, the output (first detection signal) of the first acceleration detection unit 11 mainly includes the output signal having an alternating current waveform that is a dynamic component (AC component) corresponding to the motion acceleration.

Meanwhile, as shown in FIG. 5, the second acceleration detection unit 12 includes the plurality of (in this example, four) second detection devices 12$x$1, 12$x$2, 12$y$1, and 12$y$2.

The detection devices 12$x$1 and 12$x$2 are provided on the axial centers of the front surfaces of the two bridge portions 131 and 133 facing each other in the x-axis direction. One detection device 12$x$1 is disposed on the second beam portion 130$b$ of the bridge portion 131, and the other detection device 12$x$2 is disposed on the second beam portion 130$b$ of the bridge portion 133. Meanwhile, the detection devices 12$y$1 and 12$y$2 are provided on the axial centers of the front surfaces of the two bridge portions 132 and 134 facing each other in the y-axis direction. One detection device 12$y$1 is disposed on the second beam portion 130$b$ of the bridge portion 132, and the other detection device 12$y$2 is disposed on the second beam portion 130$b$ of the bridge portion 134.

The second detection devices 12$x$1 to 12$y$2 have the same configuration, and each include a piezoresistive detection device having the long side in the axis center direction of the second beam portion 130$b$ in this embodiment. The second detection devices 12$x$1 to 12$y$2 each include a resistance layer and a pair of terminal portions connected to both ends the resistance layer in the axial direction.

The resistance layer is, for example, a conductor layer formed by doping the front surface (silicon layer) of the second beam portion 130$b$ with an impurity element, and generates a resistance change corresponding to the amount of bending deformation (stress) of the second beam portion 130$b$ in the z-axis direction between the pair of terminal portions (piezoresistive effect). The pair of terminal portions are electrically connected to the relay terminals 140 provided on the front surface of the base portion 115 via wiring layers (not shown) formed on the bridge portions 131 to 134.

Since the second acceleration detection unit 12 configured as described above detects not only the motion acceleration acting on the movable plate 120 but also the gravitational acceleration acting on the movable plate 120, because the resistance value is determined by the absolute stress value due to the characteristics of the piezo resistance. Therefore, the output (second detection signal) of the second acceleration detection unit 11 has an output waveform in which the dynamic component (AC component) corresponding to the motion acceleration is superimposed on the gravitational acceleration or static component (DC component) corresponding thereto.

Note that the present technology is not limited to the example in which the second detection devices 12$x$1 to 12$y$2 each include a piezoresistive detection device. The second detection devices 12$x$1 to 12$y$2 may each include, for example, another non-piezoelectric detection device capable of detecting the acceleration of the DC component, such as an electrostatic one. In the case of the electrostatic one, a movable electrode portion and a fixed electrode portion constituting a pair of electrodes are disposed to face each other in the axial direction of the second beam portion 130$b$, and are configured so that the facing distance between the both electrode portions changes corresponding to the above-mentioned amount of bending deformation of the second beam portion 130$b$.

The first acceleration detection unit 11 outputs acceleration detection signals (Acc-AC-x, Acc-AC-y, and Acc-AC-z (first acceleration detection signals)) in the x-axis direction, the y-axis direction, and the z-axis direction to the signal processing circuit 20 on the basis of output of the first detection devices 11x1 to 11y2.

The acceleration detection signal (Acc-AC-x) in the x-axis direction corresponds to a difference signal (ax1−ax2) between output (ax1) of detection device 11x1 and output (ax2) of the detection device 11x2. The acceleration detection signal (Acc-AC-y) in the y-axis direction corresponds to a difference signal (ay1−ay2) between output (ay1) of the detection device 11y1 and output (ay2) of the detection device 11y2. Then, the acceleration detection signal (Acc-AC-z) in the z-axis direction corresponds to the sum (ax1+ax2+ay1+ay2) of output of the detection devices 11x1 to 11y2.

Similarly, the second acceleration detection unit 12 outputs the acceleration detection signals (Acc-DC-x, Acc-DC-y, and Acc-DC-z (second acceleration detection signals)) in the x-axis direction, the y-axis direction, and the z-axis direction to the signal processing circuit 20 on the basis of output of the second detection devices 12x1 to 12y2.

The acceleration detection signal (Acc-DC-x) in the x-axis direction corresponds to a difference signal (bx1−bx2) between output (bx1) of the detection device 12x1 and output (bx2) of the detection device 12x2. The acceleration detection signal (Acc-DC-y) in the y-axis direction corresponds to a difference signal (by1−by2) between output (by1) of the detection device 12y1 and output (by2) of the detection device 12y2. Then, the acceleration detection signal (Acc-DC-z) in the z-axis direction corresponds to the sum (bx1+bx2+by1+by2) of output of the detection devices 12x1 to 12y2.

The arithmetic processing of the acceleration detection signals in the axial directions may be executed by an arithmetic circuit separately provided in the detection unit 40, or by the signal processing circuit 20.

(Control Unit)

Figure 7:
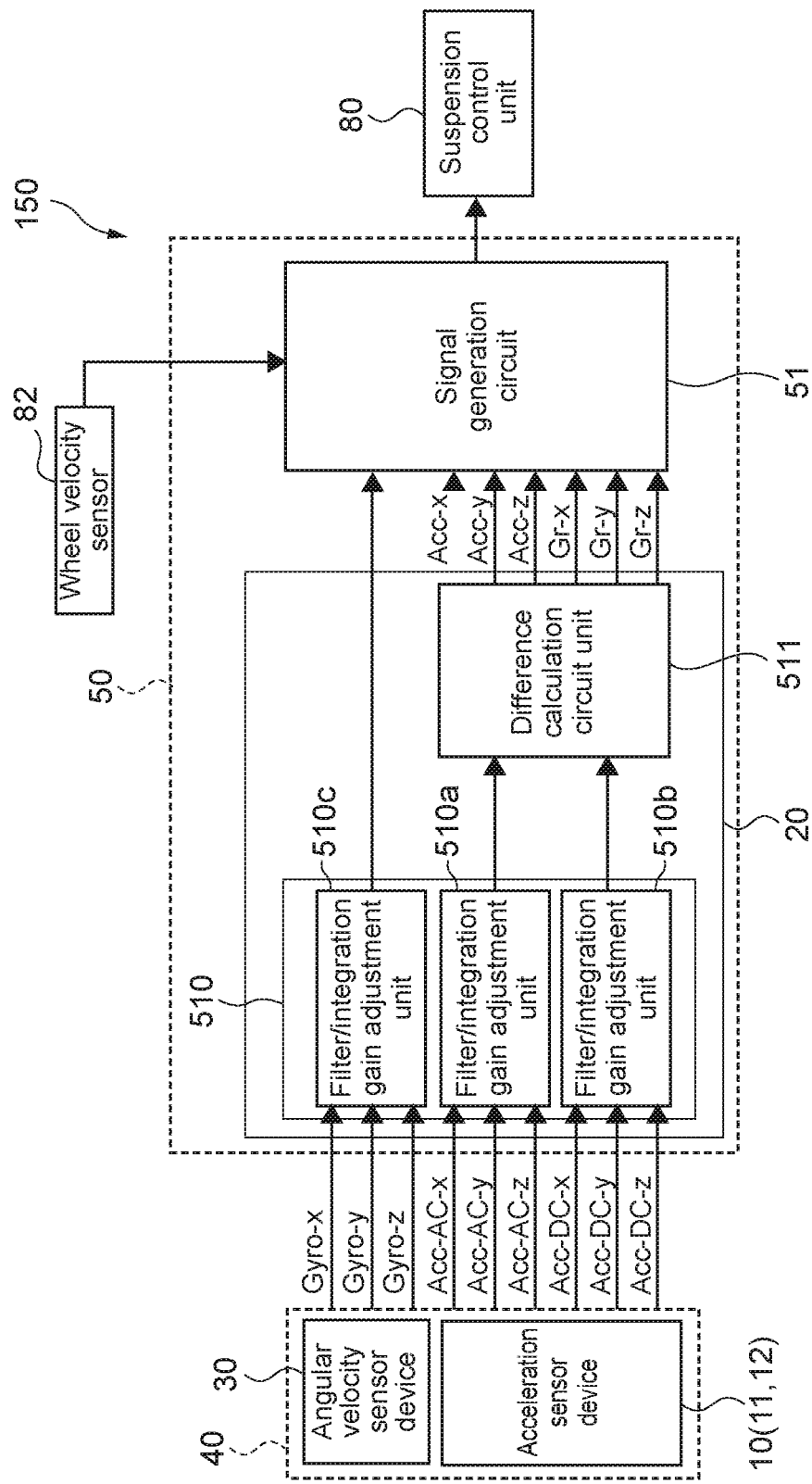
FIG. 7 is a block diagram showing a basic configuration of a signal processing circuit in the vehicle control apparatus.

FIG. 7 is a block diagram showing a configuration of the control unit 50. The control unit 50 includes the signal processing circuit 20 and the signal generation circuit 51 as described above.

The signal processing circuit 20 includes a preprocessing circuit 510 and a difference calculation circuit unit 511.

The preprocessing circuit 510 include at least one of various filters (e.g., high pass filters), an integration circuit, a gain adjustment circuit, and the like. The preprocessing circuit 510 includes a preprocessing circuit unit 510a that processes the first acceleration detection signal, a preprocessing circuit unit 510b that preprocesses the second acceleration detection signal, and a preprocessing circuit unit 510c that processes the angular velocity signals ($\omega$-x, $\omega$-y, and $\omega$-z).

The first acceleration detection signals (Acc-AC-x, Acc-AC-y, and Acc-AC-z) processed in the preprocessing circuit unit 510a are input to one input terminal of the difference calculation circuit unit 511, and the second acceleration detection signals (Acc-DC-x, Acc-DC-y, and Acc-DC-z) processed in the preprocessing circuit unit 510b are input to the other input terminal of the difference calculation circuit unit 511.

The difference calculation circuit unit 511 computes a motion acceleration (vertical acceleration or lateral acceleration) that acts on the vehicle body 101. In the difference calculation circuit unit 511, an acceleration calculation unit 200 (FIGS. 8 and 9) that extracts the dynamic acceleration components (Acc-x, Acc-y, and Acc-z) and the static acceleration components (Gr-x, Gr-y, and Gr-z) from the above-mentioned motion acceleration on the basis of the first acceleration detection signal and the second acceleration detection signal is configured.

The dynamic acceleration component typically refers to the AC component of the acceleration described above, and typically corresponds to a motion acceleration (translational acceleration, centrifugal acceleration, vertical vibration acceleration, etc.) that acts on the vehicle body 101 at the time when the vehicle 100 travels. Meanwhile, the static acceleration component refers to the DC component of the acceleration described above, and typically corresponds to a gravitational acceleration or acceleration estimated to be the gravitational acceleration.

Further, the dynamic acceleration components (Acc-x, Acc-y, and Acc-z) and the static acceleration components (Gr-x, Gr-y, and Gr-z) extracted in the difference calculation circuit unit 511 are input to the signal generation circuit 51. Meanwhile, the angular velocity detection signals ($\omega$-x, $\omega$-y, and $\omega$-z) preprocessed in the preprocessing circuit unit 510c are input to the signal generation circuit 51.

The signal generation circuit 51 compares the input dynamic acceleration components, static acceleration components, and angular velocity components with each other, computes the motion accelerations of the vehicle body 101 in the bounce direction, roll direction, and pitch direction, the angular velocities of the vehicle body 101 in the roll direction and pitch direction, the inclination angle of the vehicle body 101 with respect to the horizontal direction, and the like, and determines the behavior or posture of the vehicle body 101. Further, by referring to also the output of the wheel velocity sensor 82, the posture of the vehicle body 101 may be determined. As a result, it is possible to perform proper behavior control of the vehicle body 101 according to the travelling velocity of the vehicle 100. For example, in this embodiment, the signal generation circuit 51 generates a control command that suppresses the change in posture of the vehicle body 101 so that the determined posture of the vehicle body 101 becomes desired posture (e.g., horizontal posture), and outputs this command to the suspension control apparatus 80.

The signal generation circuit 51 typically has a plurality of threshold values set in advance in accordance with the magnitude of the dynamic acceleration or angular velocity in each axial direction, and generates a control signal according to the threshold values. The present technology is not limited to discrete (digital) posture control based on the plurality of threshold values, and continuous (analog) posture control according to the detection value may be executed. Further, priority (weighting) may be set to the acceleration detection value in each axial direction in accordance with the control mode, or priority may be set between the acceleration detection value and the angular velocity detection value. For example, in the case where the acceleration in the bounce direction is not less than a predetermined value, the posture control in the direction may be prioritized than that posture control in the roll direction or pitch direction, or vice versa.

For the motion accelerations in the bounce direction, roll direction, and pitch direction, respectively, the dynamic acceleration component (Acc-z) in the z-axis direction, the dynamic acceleration (Acc-x) in the x-axis direction, and the motion acceleration (Acc-y) in the y-axis direction are mainly referred to. Further, for the angular velocities in the roll direction and pitch direction, respectively, the angular velocity detection signal ($\omega$-y) around the y axis, and the angular velocity detection signal ($\omega$-x) around the x axis are mainly referred to. Further, the inclination angle of the vehicle body 101 with respect to the horizontal direction is computed from, for example, the gravity (vertical direction) detected on the basis of the static acceleration components (Gr-x, Gr-y, and Gr-z) of the acceleration.

Note that the angular velocity in the yaw direction may be computed by referring to the angular velocity detection signal (ω-z) around the z axis. Further, by combining the angular velocity detection signal and the dynamic acceleration components of the acceleration detection signal, it is possible to compute the rotation radius and rotation center of the vehicle 100 during turning (see Japanese Patent No. 5407863).

(Signal Processing Circuit)

Next, details of the signal processing circuit 20 will be described.

Figure 8:
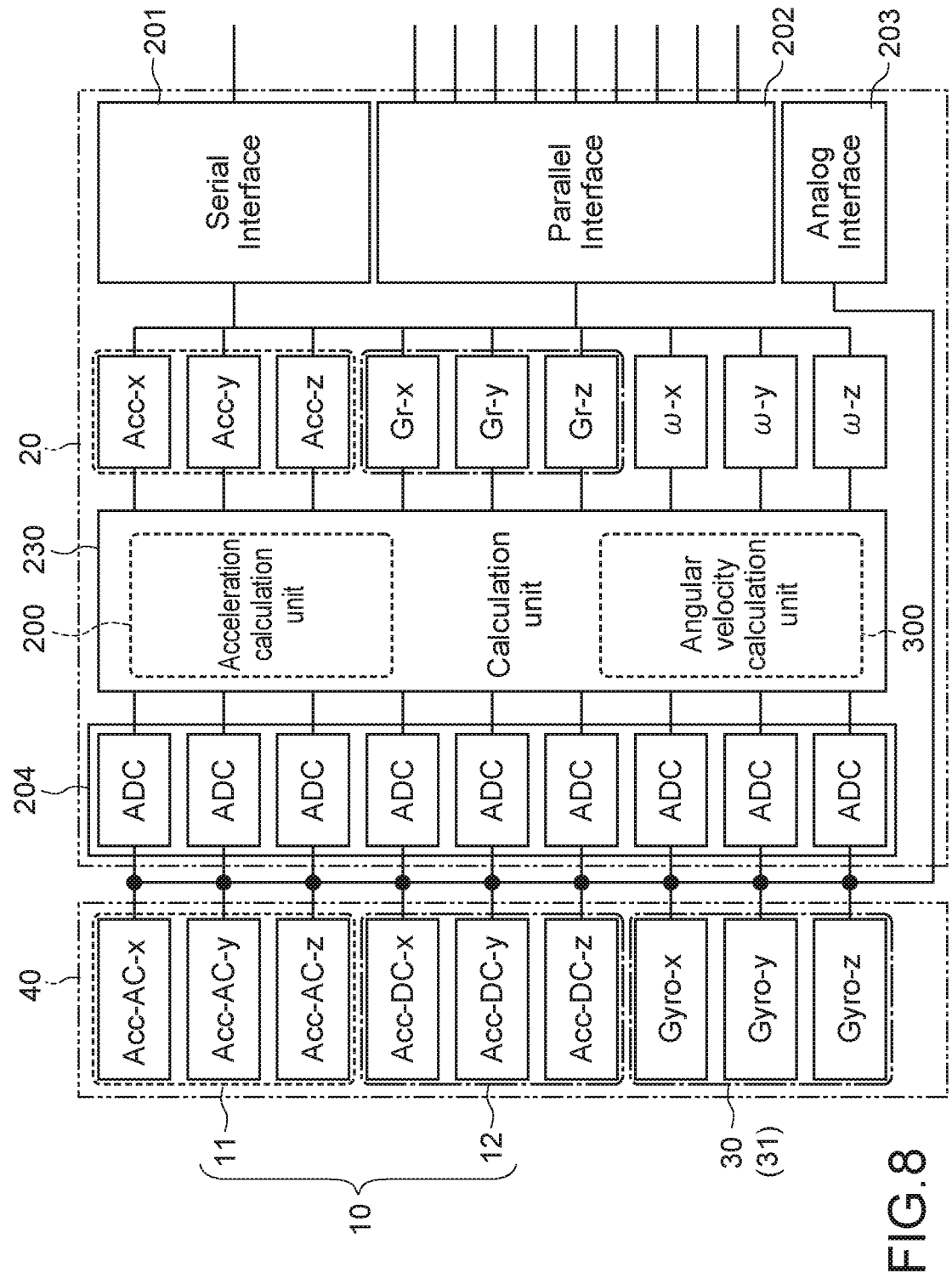
FIG. 8 is a block diagram showing details of the signal processing circuit in the vehicle control apparatus.

FIG. 8 is a block diagram showing a basic configuration of the signal processing circuit 20. As shown in the figure, the acceleration sensor device 10 includes two types of acceleration detection units (the first acceleration detection unit 11 and the second acceleration detection unit 12), each of which detects information relating to accelerations in the three-axis directions. The angular velocity sensor device 30 includes an angular velocity detection unit 31.

The first acceleration detection unit 11 is a piezoelectric acceleration sensor, and outputs each of a signal (Acc-AC-x) containing information relating to an acceleration parallel to the x-axis direction, a signal (Acc-AC-y) containing information relating to acceleration parallel to the y-axis direction, and a signal (Acc-AC-z) containing information relating to acceleration parallel to the z-axis direction. These signals (first acceleration detection signals) have an alternating current waveform corresponding to the acceleration of each axis.

Meanwhile, the second acceleration detection unit 12 is a non-piezoelectric acceleration sensor, and outputs each of a signal (Acc-DC-x) containing information relating to an acceleration parallel to the x-axis direction, a signal (Acc-DC-y) containing information relating to an acceleration parallel to the y-axis direction, and a signal (Acc-DC-z) containing information relating to an acceleration parallel to the z-axis direction. These signals (second acceleration detection signals) have an output waveform in which an alternating current component corresponding to the acceleration of each axis is superimposed on a direct current component.

The signal processing circuit 20 can be realized by hardware devices used for a computer such as a central processing unit (CPU), a random access memory (RAM), a read only memory (ROM), etc. and necessary software. Instead of or in addition to the CPU, a programmable logic device (PLD) such as a field programmable gate array (FPGA) or a digital signal processor (DSP) may be used.

The signal processing circuit 20 includes the acceleration calculation unit 200 that extracts each of a dynamic acceleration component and a static acceleration component from the above-mentioned accelerations in the three-axis directions on the basis of the output (first acceleration detection signal) of the first acceleration detection unit 11 and the output (second acceleration detection signal) of the second acceleration detection unit 12, and an angular velocity calculation unit 300 that computes each of the angular velocity signals (ω-x, ω-y, and ω-z) (third detection signal) around the three axes on the basis of the angular velocity detection signals (Gyro-x, Gyro-y, and Gyro-z) around the three axes. The acceleration calculation unit 200 corresponds to the difference calculation circuit unit 511 (FIG. 8) described above.

The signal processing circuit 20 further includes a serial interface 201, a parallel interface 202, and an analog interface 203.

The acceleration calculation unit 200 extracts each of the dynamic acceleration components (Acc-x, Acc-y, and Acc-z) and the static acceleration components (Gr-x, Gr-y, and Gr-z) on the basis of the acceleration detection signal in each axis direction output from the first acceleration detection unit 11 and the second acceleration detection unit 12.

Note that the acceleration calculation unit 200 is realized by loading a program recorded in a ROM, which is an example of a non-transitory computer readable recording medium, into a RAM, etc. and executing the program by the CPU.

The angular velocity calculation unit 300 computes each of the angular velocity signals (ω-x, ω-y, and ω-z) around the three axes on the basis of the angular velocity detection signals (Gyro-x, Gyro-y, and Gyro-z) around the three axes. The angular velocity calculation unit 300 may be configured separately from the acceleration calculation unit 200 or may be configured by a calculation unit 230 common to the acceleration calculation unit 200.

The serial interface 201 is configured to be capable of successively outputting the dynamic and static acceleration components of the respective axes generated in the acceleration calculation unit 200 and the angular velocity signal of each axis generated in the angular velocity calculation unit 300 to the signal generation circuit 51. The parallel interface 202 is configured to be capable of outputting the dynamic acceleration component and the static acceleration component of each axis generated in the acceleration calculation unit 200 in parallel to the signal generation circuit 51. The signal processing circuit 20 may include at least one of the serial interface 201 or the parallel interface 202, or may be selectively switched by an instruction from the signal generation circuit 51. The analog interface 203 is configured to be capable of outputting the output of the first and second acceleration detection units 11 and 12 to the signal generation circuit 51 without change, and may be omitted as necessary.

Note that in FIG. 8, reference numeral 204 denotes a converter for analog-digital (AD) conversion of the acceleration detection signal of each axis. The preprocessing circuit 510 illustrated in FIG. 7 may be included in a block 204 including the above-mentioned converter or may be included in the calculation unit 230.

Figure 9:
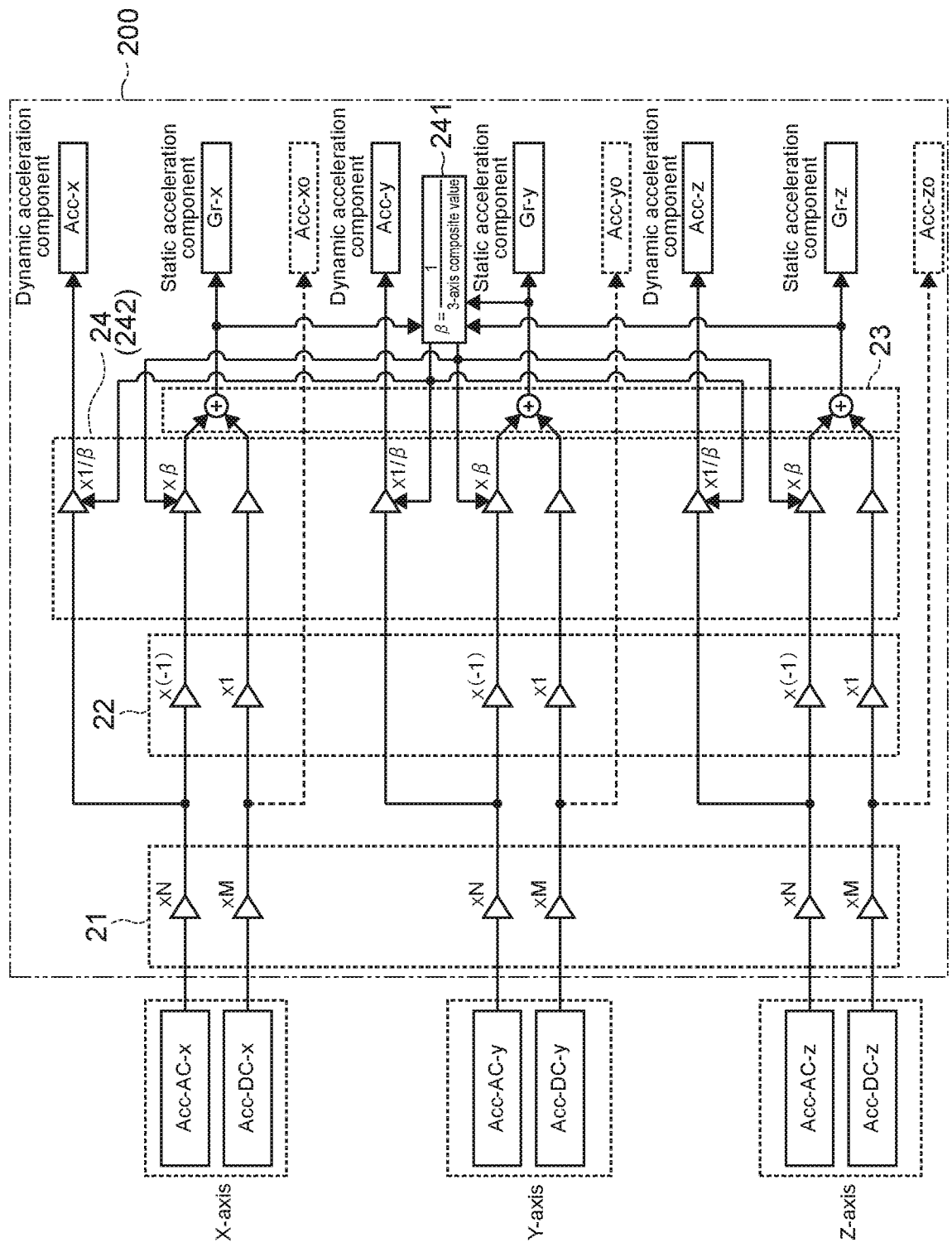
FIG. 9 is a circuit diagram showing a configuration example of an acceleration calculation unit in the signal processing circuit.

FIG. 9 is a circuit diagram showing a configuration example of the acceleration calculation unit 200.

The acceleration calculation unit 200 includes a gain adjustment circuit 21, a sign inversion circuit 22, an addition circuit 23, and a correction circuit 24. These circuits 21 to 24 have a common configuration for each axis of x, y and z, and perform common arithmetic processing on each axis, so that a dynamic acceleration component (motion acceleration) and a static acceleration component (gravitational acceleration) of each axis are extracted.

Figure 10:
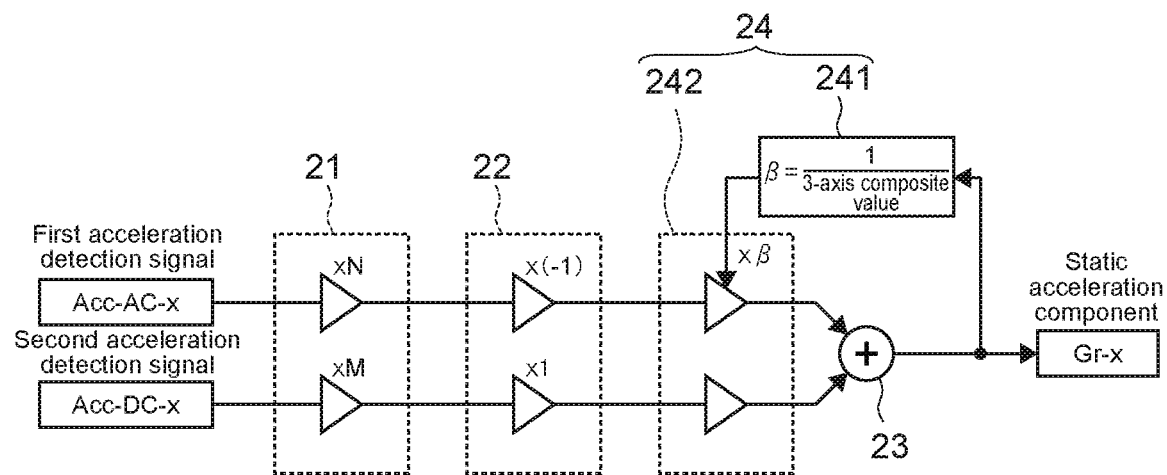
FIG. 10 is a diagram showing processing blocks in one axis direction in the acceleration calculation unit.

Hereinafter, as a representative example, a processing circuit for an acceleration detection signal in the x-axis direction will be described. FIG. 10 shows a processing block for extracting a static acceleration component from an acceleration detection signal in the x-axis direction.

The gain adjustment circuit 21 adjusts gain of each signal so that the first acceleration detection signal (Acc-AC-x) in the X-axis direction output from the first acceleration detection unit 11 (11x1 and 11x2) and the second acceleration detection signal (Acc-DC-x) in the x-axis direction output from the second acceleration detection unit 12 (12x1 and 12x2) are mutually at the same level. The gain adjustment circuit 21 includes an amplifier for amplifying the output (Acc-AC-x) of the first acceleration detection unit 11 and the output (Acc-DC-x) of the second acceleration detection unit 12.

Figure 11:
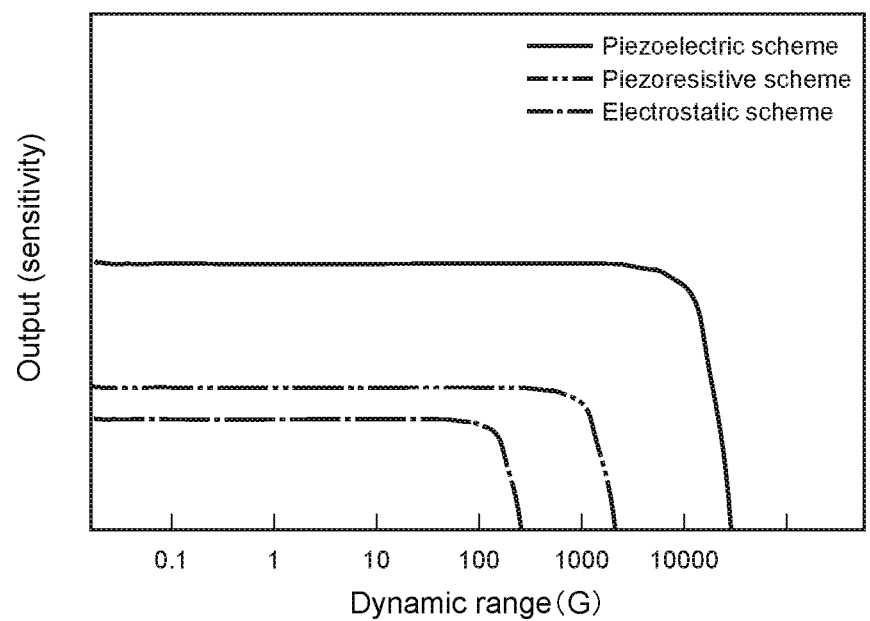
FIG. 11 is a diagram describing output characteristics of a plurality of acceleration sensors having different detection methods.

In general, output sensitivity and a dynamic range of the acceleration sensor differ depending on the detection scheme. For example, as shown in FIG. 11, the output sensitivity is high and the dynamic range is wide (large) in a piezoelectric acceleration sensor than in a non-piezoelectric (piezoresistive or electrostatic) acceleration sensor. In this embodiment, the first acceleration detection unit 11 corresponds to a piezoelectric acceleration sensor, and the second acceleration detection unit 12 corresponds to a piezoresistive acceleration sensor.

In this regard, the gain adjustment circuit 21 amplifies the outputs of the respective acceleration detection units 11 and 12 (first and second acceleration detection signals) by N and M times, respectively, so that the outputs of the acceleration detection units 11 and 12 have the same level. The amplification factors N and M are positive numbers and satisfy a relationship of N<M. The values of the amplification factors N and M are not particularly limited, and may be set as coefficients that serve as temperature compensation of the acceleration detection units 11 and 12 depending on the use environment (use temperature) of the detection unit 40.

Figure 12:
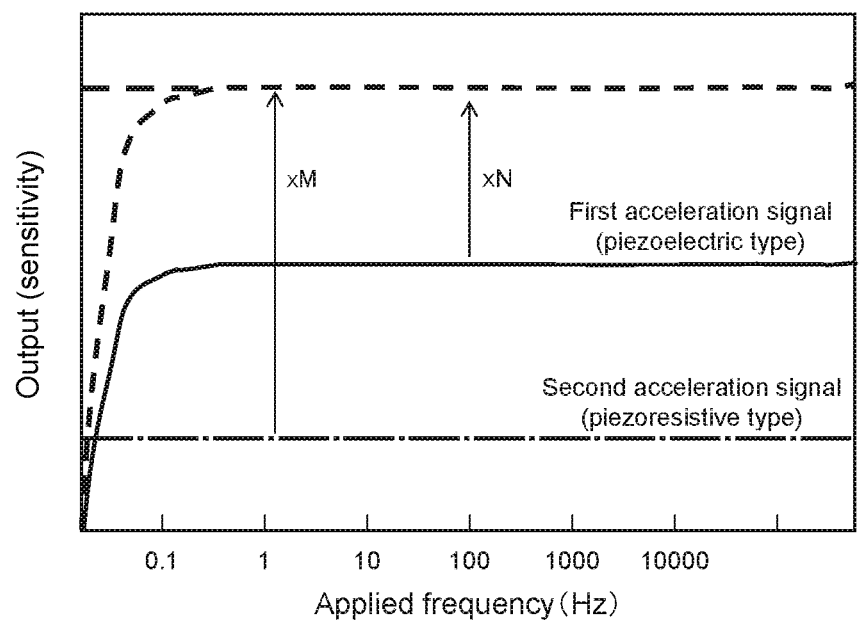
FIG. 12 is a diagram describing an operation of the acceleration calculation unit.

FIG. 12 is an example of output characteristics of the first acceleration detection signal and the second acceleration detection signal, and shows the output characteristic before gain adjustment and the output characteristic after gain adjustment in comparison. In the figure, a horizontal axis indicates a frequency of the acceleration acting on the detection unit 40, and a vertical axis indicates the output (sensitivity) (the same is applied to FIG. 13 to FIG. 17).

As shown in the figure, in a first acceleration detection signal (Acc-AC-x) of a piezoelectric scheme, output sensitivity of an acceleration component in a low frequency region of 0.5 Hz or less is lower than the output sensitivity of the acceleration component in a higher frequency region. In particular, the output sensitivity in a stationary state (motion acceleration 0) is approximately zero. Meanwhile, a second acceleration detection signal (Acc-DC-x) of a piezoresistive scheme has constant output sensitivity over the entire frequency range, and thus an acceleration component in a stationary state (that is, a static acceleration component) can be detected at constant output sensitivity. Therefore, when the gain adjustment circuit 21 amplifies the first acceleration detection signal and the second acceleration detection signal at predetermined magnifications, respectively, to obtain the same output level, it is possible to extract a static acceleration component in a difference calculation circuit described below.

The sign inversion circuit 22 and the addition circuit 23 constitute a difference calculation circuit that extracts a static acceleration component (DC component) from the acceleration of each axis direction on the basis of a difference signal between the first acceleration detection signal (Acc-AC-x) and the second acceleration detection signal (Acc-DC-x).

Figure 13:
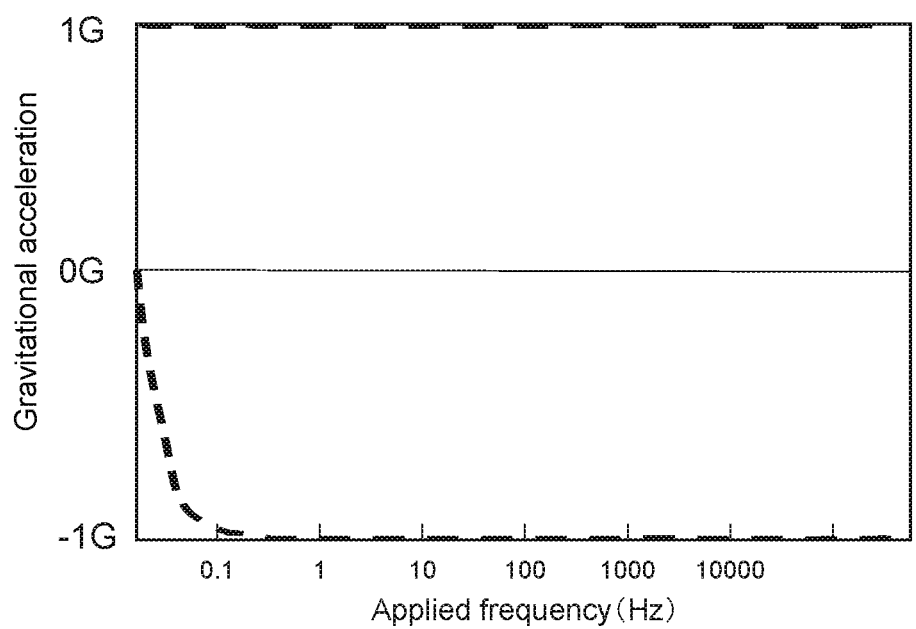
FIG. 13 is a diagram describing an operation of the acceleration calculation unit.

The sign inversion circuit 22 has an inversion amplifier (amplification factor: −1) that inverts the sign of the first acceleration detection signal (Acc-AC-x) after gain adjustment. FIG. 13 shows an example of an output characteristic of the first acceleration detection signal (Acc-AC-x) after sign inversion. Here, a case in which the sensor device 10 detects an acceleration of 1 G in the x-axis direction is shown as an example.

Note that the second acceleration detection signal (Acc-DC-x) is output to the addition circuit 23 in a subsequent stage without inverting the sign thereof. The sign inversion circuit 22 may be configured in common with the gain adjustment circuit 21 in a preceding stage.

Figure 14:
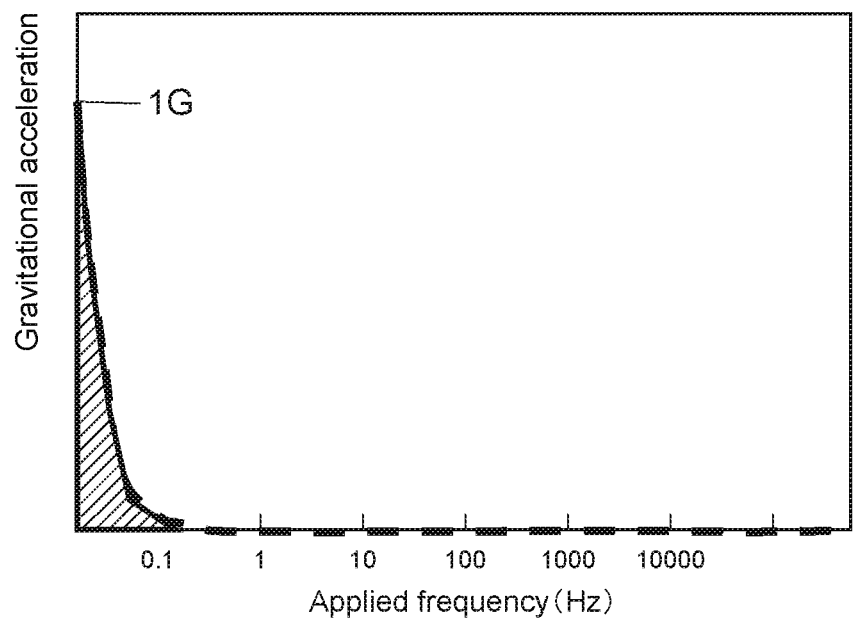
FIG. 14 is a diagram describing an operation of the acceleration calculation unit.

The addition circuit 23 adds the first acceleration detection signal (Acc-AC-x) and the second acceleration detection signal (Acc-DC-x) output from the sign inversion circuit 22 to output a static acceleration component. FIG. 14 shows an example of an output characteristic of the addition circuit 23. Since the first and second acceleration detection signals are adjusted to the same level in the gain adjustment circuit 21, a net static acceleration component (Gr-x) can be extracted by obtaining a difference signal thereof. The static acceleration component typically corresponds to a gravitational acceleration component or an acceleration component including the gravitational acceleration.

Figure 15:
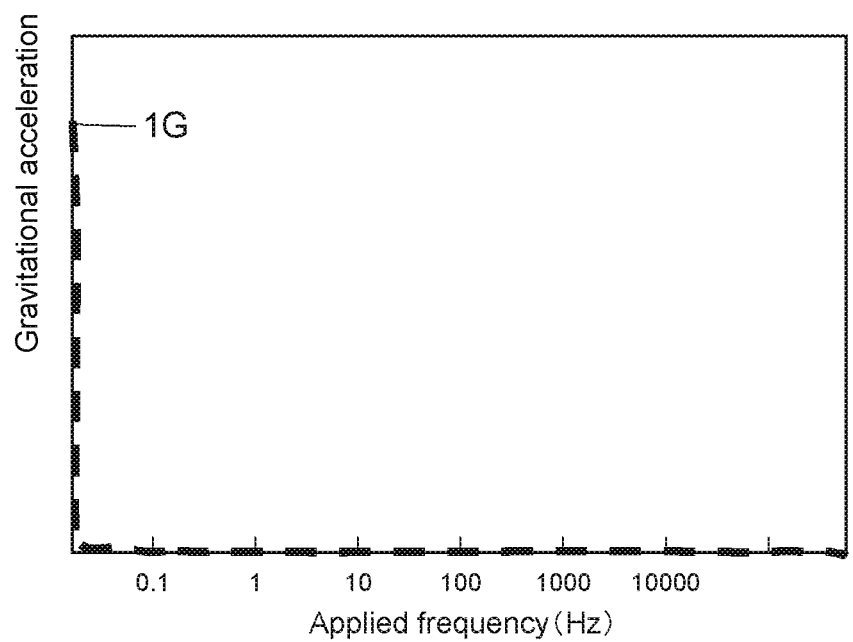
FIG. 15 is a diagram describing an operation of the acceleration calculation unit.

When the static acceleration component output from the addition circuit 23 corresponds to only a gravitational acceleration, theoretically, an output of a significant acceleration component appears only near 0 Hz as shown in FIG. 15. However, in practice, since detection sensitivity in the vicinity of a low frequency of the first acceleration detection unit 11 having a piezoelectric detection type is low, and acceleration components in axis directions (here, the y-axis direction and the z-axis direction) other than a target axis unavoidably superimpose due to generation of sensitivities of other axes, a dynamic acceleration component in a frequency domain indicated by hatching in FIG. 14 leaks into an output of the addition circuit 23 as an error component. In this regard, in this embodiment, the correction circuit 24 for canceling the error on the basis of the output of the addition circuit 23 is provided.

The correction circuit 24 includes a 3-axis composite value calculation unit 241 and a low band sensitivity correction unit 242. The correction circuit 24 computes a correction coefficient β on the basis of the output of the addition circuit 23 (the difference signal between the first and second acceleration detection signals), and corrects the first acceleration detection signal (Acc-AC-x) using the correction coefficient β.

The 3-axis composite value calculation unit 241 is commonly provided for processing blocks that extract static acceleration components in all the x-axis, y-axis, and z-axis directions, and computes the correction coefficient β using a sum value of the output (the difference signal between the first and second acceleration detection signals) of the addition circuit 23 in each axis.

Specifically, the 3-axis composite value calculation unit 241 computes a composite value $(((Gr-x)^2+(Gr-y)^2+(Gr-z)^2))$ of the static acceleration components (Gr-x, Gr-y, and Gr-z) in the three axis directions, and regards a portion of the composite value exceeding 1 as a low band sensitivity error portion (area indicated by hatching in FIG. 14) to compute the correction coefficient β corresponding to a reciprocal of the composite value.

$$\beta=1/(N((Gr-x)^2+(Gr-y)^2+(Gr-z)^2))$$

Note that values of the static acceleration components (Gr-x, Gr-y, and Gr-z) in the three respective axis directions differ depending on the posture of the acceleration sensor device 10, and momentarily change corresponding to posture change of the acceleration sensor device 10. For example, when the z-axis direction of the acceleration sensor device 10 coincides with a gravity direction (vertical direction), the static acceleration component (Gr-z) in the z-axis direction indicates a larger value than the static acceleration components (Gr-x, and Gr-y) in the x-axis direction and the y-axis direction. In this way, it is possible to estimate the gravity direction of the acceleration sensor device 10 at the time from the values of the static acceleration components (Gr-x, Gr-y, and Gr-z) in the three respective axis directions.

Figure 16:
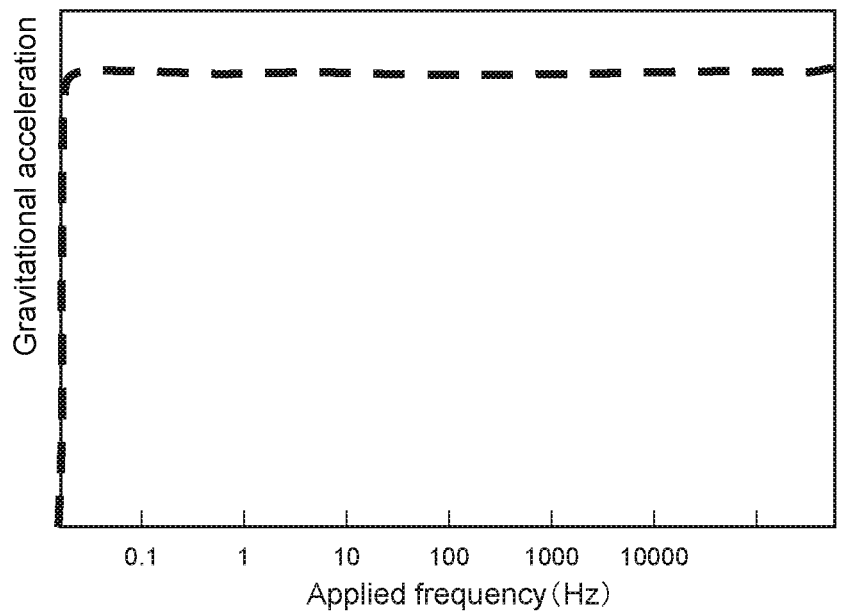
FIG. 16 is a diagram describing an operation of the acceleration calculation unit.
Figure 17:
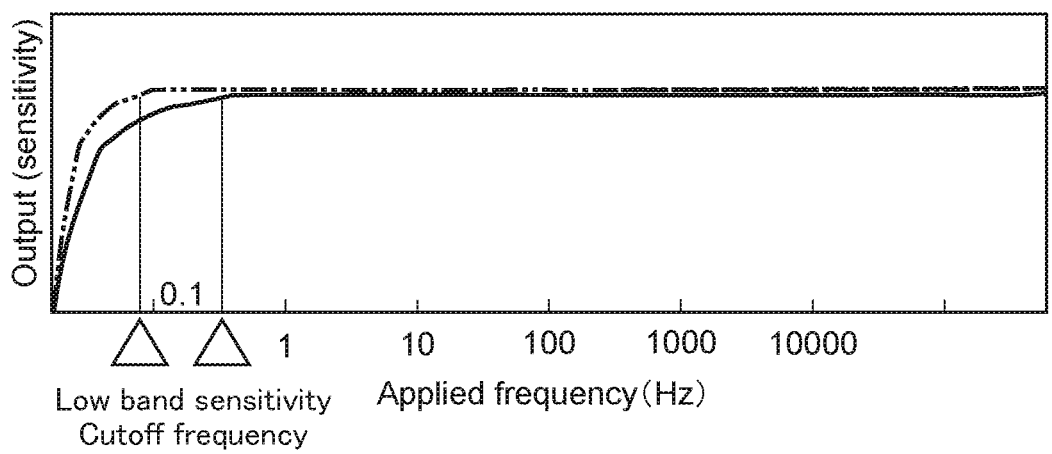
FIG. 17 is a diagram describing an operation of the acceleration calculation unit.

The low band sensitivity correction unit 242 has a multiplier that multiplies the correction coefficient β by the first acceleration detection signal (Acc-AC-x) whose sign is inverted. In this way, the first acceleration detection signal is input to the addition circuit 23 in a state in which a low band sensitivity error is reduced, and thus an acceleration signal having a frequency characteristic shown in FIG. 16 is output from the addition circuit 23. In this way, since only the static acceleration component corresponding to the gravitational acceleration is output, extraction accuracy of the gravitational acceleration component is improved.

In this embodiment, the correction circuit 24 is configured to execute a process of multiplying the first acceleration detection signal by the correction coefficient β at the time of calculating the static acceleration component. However, the present technology is not limited thereto. The correction circuit 24 may be configured to execute a process of multiplying the second acceleration detection signal (Acc-DC-x) by the correction coefficient β, or the acceleration detection signal to be corrected may be switched between the first acceleration detection signal and the second acceleration detection signal corresponding to a magnitude of an acceleration change.

The correction circuit 24 is configured to correct the first acceleration detection signal using the correction coefficient β when the change in acceleration of either one of the first acceleration detection signal and the second acceleration detection signal is greater than or equal to a predetermined value. The larger the change in acceleration (the higher an applied frequency), the higher a rate at which an error component leaks into the first acceleration detection signal. Thus, the error component can be efficiently reduced. The configuration is particularly effective when the motion acceleration is relatively large, e.g., when travelling on a rough road where rolling and pitching are repeated violently while crossing the road surface gap.

Meanwhile, the correction circuit 24 is configured to correct the second acceleration detection signal using the correction coefficient β when the change in acceleration of either one of the first acceleration detection signal and the second acceleration detection signal is less than or equal to a predetermined value. The smaller the change in acceleration (the lower the applied frequency), the higher a rate at which the error component leaks into the second acceleration detection signal. Thus, the error component can be efficiently reduced. The configuration is particularly effective when the motion acceleration is relatively small, e.g., when travelling at a constant velocity.

The static acceleration component in each axis direction is extracted as described above. However, for extraction of the dynamic acceleration components (Acc-x, Acc-y, and Acc-z) in the respective axis direction, as illustrated in FIG. 9, the first acceleration detection signals (Acc-AC-x, Acc-AC-y, and Acc-AC-z) whose gains are adjusted in the gain adjustment circuit 21 are referred to.

Here, even though the first acceleration detection signal may be used without change for extraction of the dynamic acceleration component, since a part of the dynamic acceleration component may leak into the static acceleration component as described above in some cases, the dynamic acceleration component decreases, so that detection with high precision becomes difficult. In this regard, by correcting the first acceleration detection signal using the correction coefficient β computed in the correction circuit 24, it is possible to achieve the detection accuracy of the dynamic acceleration component.

More specifically, as illustrated in FIG. 9, the correction circuit 24 (the low band sensitivity correction unit 242) has the multiplier that multiplies the reciprocal (1/β) of the correction coefficient β acquired by the 3-axis composite value calculation unit 241 by the first acceleration detection signals (Acc-AC-x, Acc-AC-y, and Acc-AC-z). In this way, a low band sensitivity component of the first acceleration signal is compensated, and thus the extraction accuracy of the dynamic acceleration components (Acc-x, Acc-y, and Acc-z) is improved.

In this embodiment, the correction circuit 24 is configured to execute a process of multiplying the first acceleration detection signal by the reciprocal (1/β) of the correction coefficient at the time of calculating the dynamic acceleration component. However, the present technology is not limited thereto, and the correction circuit 24 may be configured to execute a process of multiplying the second acceleration detection signals (Acc-DC-x, Acc-DC-y, and Acc-DC-z) by the reciprocal (1/β) of the correction coefficient. Alternatively, similarly to the above-described scheme of calculating the static acceleration component, the acceleration detection signal to be corrected may be switched between the first acceleration detection signal and the second acceleration detection signal corresponding to the magnitude of the acceleration change.

It is presumed that a process of correcting the dynamic acceleration component and the static acceleration component by the low band sensitivity correction unit 242 is typically effective when the composite value computed by the 3-axis composite value calculation unit 241 is other than 1 G (G: gravitational acceleration). Note that examples of a case in which the composite value is less than 1 G include a case in which the sensor device 10 is falling free, etc.

Note that the first acceleration detection signal detected by the piezoelectric scheme has an output characteristic similar to that of a high pass filter (HPF), and an output less than or equal to a cutoff frequency remains in an output of the addition circuit 23 as an error component of low band sensitivity (see FIG. 14). In this embodiment, the error component is reduced by an arithmetic scheme using the correction circuit 24. However, to enhance canceling accuracy of the error component, it is desirable that the cutoff frequency is as low as possible.

In this regard, for example, a piezoelectric having a relatively large capacitance and internal resistance may be used as a piezoelectric film of the detection devices (11x1, 11x2, 11y1, and 11y2) constituting the first acceleration detection unit 11. In this way, for example, as indicated by an alternate long and short dash line in FIG. 17, a cutoff frequency of the low band sensitivity can be reduced as close to 0 Hz as possible, and thus an error component of the low band sensitivity can be reduced as much as possible.

Next, a description will be given of a method of processing an acceleration signal in the acceleration calculation unit 200 configured as described above.

When an acceleration acts on the acceleration sensor device 10, the movable plate 120 moves relative to the base portion 115 in a manner illustrated in FIGS. 6A, 6B, and 6C corresponding to a direction of the acceleration. The first acceleration detection unit 11 (detection devices 11x1, 11x2, 11y1, and 11y2) and the second acceleration detection unit 12 (detection devices 12x1, 12x2, 12y1, and 12y2) output detection signals corresponding to mechanical deformation of the bridge portions 131 to 134 to the signal processing circuit 20.

Figure 18:
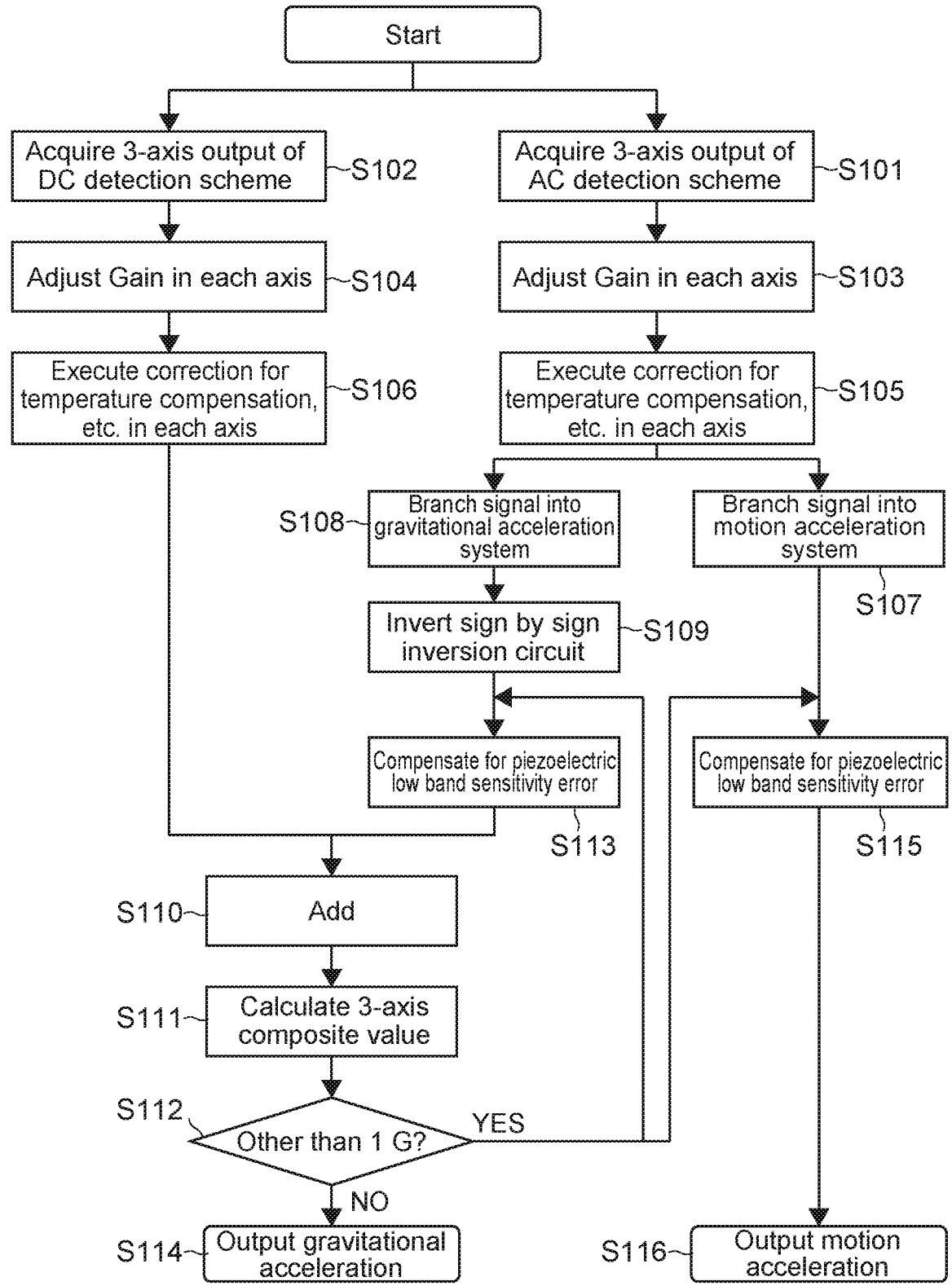
FIG. 18 is a flowchart showing an example of processing procedure of the acceleration calculation unit.

FIG. 18 is a flowchart showing an example of a processing procedure for the acceleration detection signal in the signal processing circuit 20 (acceleration calculation unit 200).

The signal processing circuit 20 receives the first acceleration detection signals (Acc-AC-x, Acc-AC-y, and Acc-AC-z) in the respective axes from the first acceleration detection unit 11 and receives (acquires) the second acceleration detection signals (Acc-DC-x, Acc-DC-y, and Acc-DC-z) in the respective axes from the second acceleration detection unit 12 at a predetermined sampling interval (Steps 101 and 102). Acquisition of these detection signals may be performed simultaneously (in parallel) or successively (in series).

Subsequently, the signal processing circuit 20 adjusts the gain of each detection signal in the gain adjustment circuit 21 so that the first and second acceleration detection signals have the same level for each axis (FIG. 18, Steps 103 and 104). Further, as necessary, correction for the purpose of temperature compensation of the first and second acceleration detection signals is performed for each axis (Steps 105 and 106).

Subsequently, the signal processing circuit 20 branches the first acceleration detection signals (Acc-AC-x, Acc-AC-y, and Acc-AC-z) of the respective axes into a dynamic acceleration computation system (motion acceleration system) and a static acceleration computation system (gravitational acceleration system) (Steps 107 and 108). The first acceleration detection signal branched into the static acceleration computation system is input to the addition circuit 23 after the sign thereof is inverted in the sign inversion circuit 22 (FIG. 13, Step 109).

The signal processing circuit 20 causes the addition circuit 23 to add the first acceleration detection signals (Acc-AC-x, Acc-AC-y, and Acc-AC-z) whose signs are inverted and the second acceleration detection signals (Acc-DC-x, Acc-DC-y, and Acc-DC-z) to compute the static acceleration components (Gr-x, Gr-y, and Gr-z) for the respective axes (FIG. 14, Step 110). Further, the signal processing circuit 20 calculates the 3-axis composite value of these static acceleration components in the 3-axis composite value calculation unit 241 (Step 111), and executes a process of multiplying the correction coefficient β corresponding to the reciprocal of the composite value by the first acceleration detection signals (Acc-AC-x, Acc-AC-y, and Acc-AC-z) whose signs are inverted when the value is other than 1 G in the low band sensitivity correction unit 242 (Steps 112 and 113). When the composite value is 1 G, the signal processing circuit 20 outputs the computed gravitational acceleration component (static acceleration component) to the outside (Step 114). Note that the present technology is not limited thereto, and the computed gravitational acceleration component (static acceleration component) may be output to the outside each time the composite value is computed.

Meanwhile, when the composite value is other than 1 G, the signal processing circuit 20 executes a process of multiplying the reciprocal (1/β) of the computed correction coefficient β by the first acceleration detection signals (Acc-AC-x, Acc-AC-y, and Acc-AC-z) branched into the motion acceleration system (Steps 112 and 115). When the composite value is 1 G, the signal processing circuit 20 outputs the computed motion acceleration component (dynamic acceleration component) to the outside (Step 116). Note that the present technology is not limited thereto, and the computed motion acceleration component (dynamic acceleration component) may be output to the outside each time the composite value is computed.

[Effect]

As described above, the vehicle control apparatus 150 according to this embodiment extracts the dynamic acceleration component and static acceleration component in each of the axial directions (x, y, and z-axis directions) from the acceleration acting on the vehicle body 101 on the basis of the first acceleration detection signal and the second acceleration detection signal. As a result, it is possible to perform appropriate posture control by accurately measuring the posture of the vehicle body 101 even in the case of travelling with a drastic posture change such as roll and pitch.

Figure 19A:
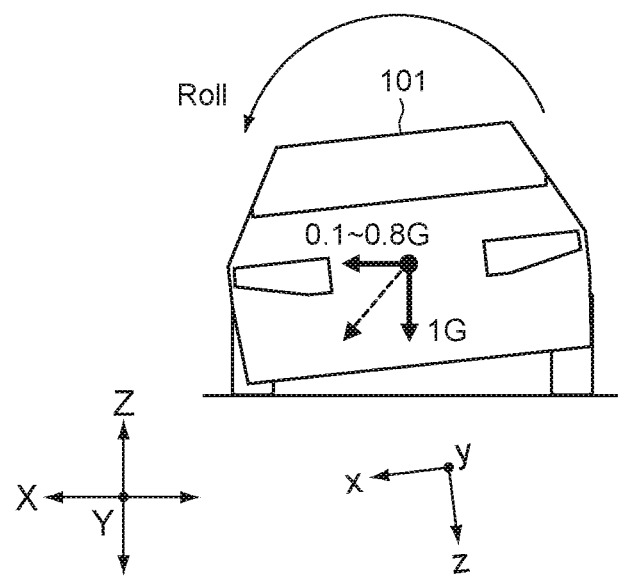
FIG. 19A is a schematic diagram of a vehicle describing an operation of the vehicle control apparatus.
Figure 19B:
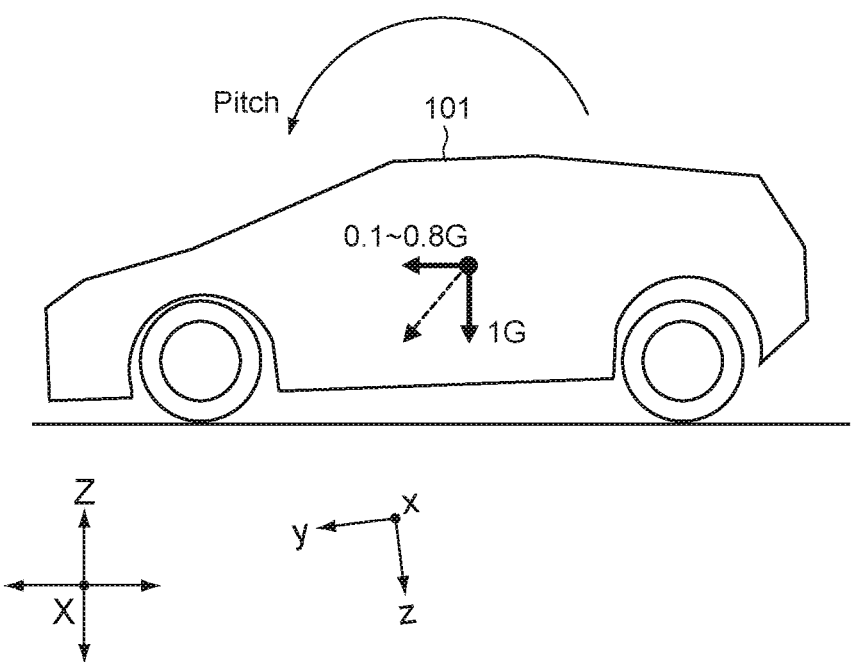
FIG. 19B is a schematic diagram of a vehicle describing an operation of the vehicle control apparatus.

For example, as schematically shown in FIGS. 19A and 19B, in the case where the acceleration sensor is installed in the vehicle body 101 so that the up-and-down direction axis (z axis) of the acceleration sensor is parallel to the vertical axis, the gravitational acceleration leaks into the lateral direction detection axes (x axis and y axis) of the acceleration sensor when the vehicle body 101 is inclined with respect to the horizontal plane (xy plane) by roll or pitch.

The leakage of the gravitational acceleration into the lateral direction detection axis leads to a measurement error of the posture angle of the vehicle body 101, and the amount of leakage differs depending on the characteristics of the acceleration sensor device to be used. For example, in the case where the vehicle body 101 is inclined by five degrees with respect to the horizontal plane, the amount of leakage is approximately 87 mG (0.087 G), and the amount of leakage increases as the inclination is larger. In the case of a four-wheel vehicle, generally, the maximum G value in the lateral direction at the time of cornering is approximately 0.1 G to 0.8 G, and the maximum G value in the front-and-rear direction at the time of braking is approximately 0.1 G to 1.0 G. Therefore, an error of approximately 0.087 G occurs therebetween. Then, the vehicle control apparatus using the existing acceleration sensor needs to perform control in anticipation of the amount corresponding to the above-mentioned error. For this reason, for example, it is very difficult to perform posture control with high precision in the control mode in which control of bounce is switched to control of suppressing roll or pitch so as to suppress roll or pitch.

Meanwhile, in accordance with this embodiment, since it is configured to extract, from the acceleration in each axial direction detected by the acceleration sensor device 10, a net dynamic acceleration component from which a static acceleration component has been removed, it is possible to detect the motion acceleration in the lateral direction with high precision without being affected by leakage of the gravitational acceleration into the lateral direction detection axis. As a result, even in the case where a drastic posture change such as roll and pitch occurs in the vehicle body 101, it is possible to measure the accurate posture of the vehicle body and realize appropriate behavior control or posture control.

Further, since a piezoelectric acceleration detection device is adopted as a first acceleration detection signal of the acceleration detection device 10, the leakage of the gravitational acceleration is little, and output with no gap limitation and with a wide dynamic range can be achieved. As a result, it is possible to detect the dynamic acceleration with high precision on the basis of the first acceleration detection signal even in the case where roll or pitch is large.

Meanwhile, since a non-piezoelectric acceleration detection device such as a piezoresistive one is employed as the second acceleration detection signal of the acceleration detection device 10, it is possible to detect the inclination of the vehicle body 101 with respect to the horizontal direction with high precision.

As described above, in accordance with this embodiment, since the posture of the vehicle body 101 can be accurately determined by complementing the first acceleration detection signal and the second acceleration detection signal, it is possible to realize behavior control with high precision.

Second Embodiment

Figure 20:
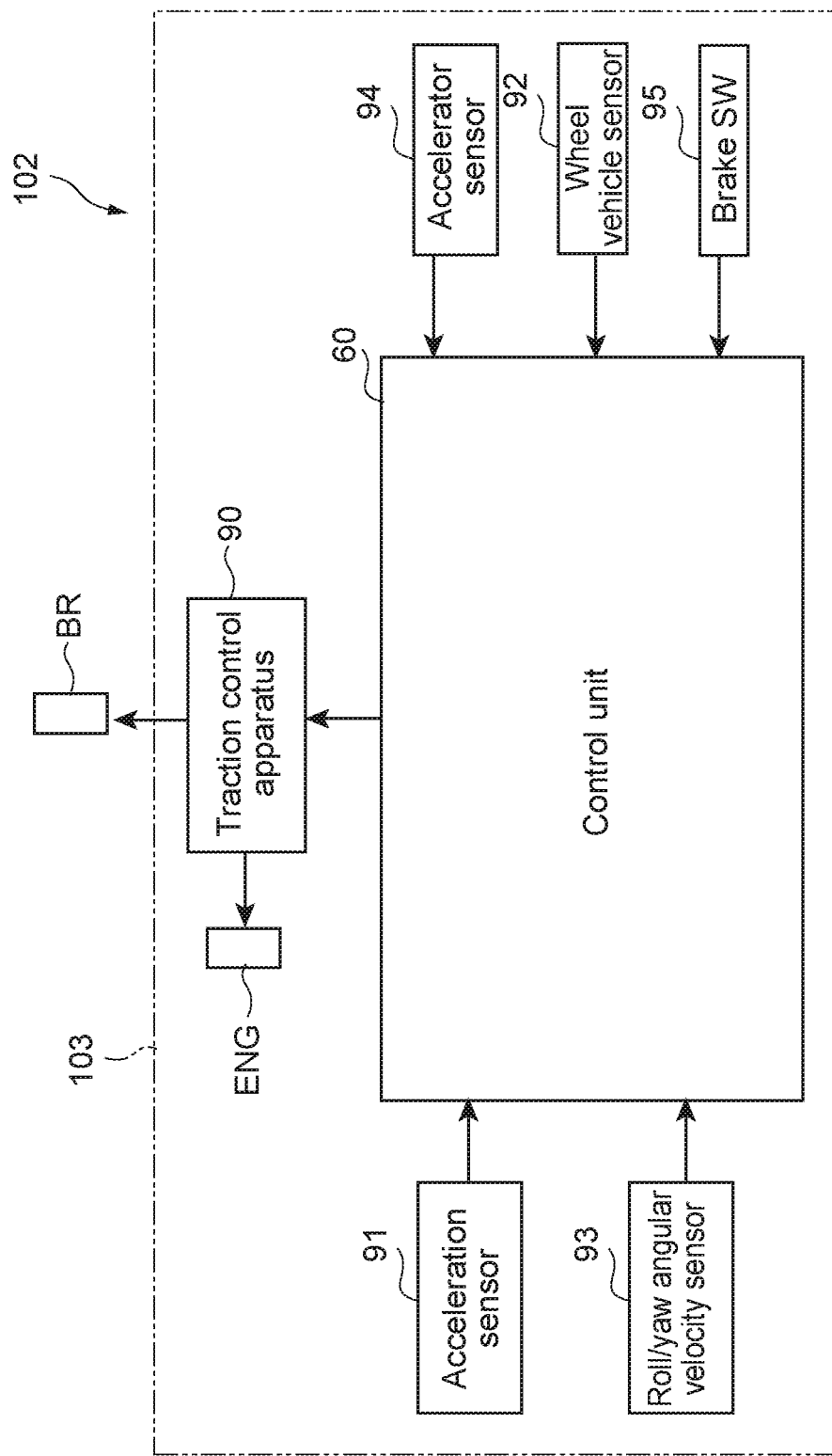
FIG. 20 is a schematic configuration diagram showing a vehicle control apparatus according to another embodiment of the present technology.

FIG. 20 is a block diagram showing a configuration of the main part of a vehicle 102 equipped with a vehicle control apparatus according to a second embodiment of the present technology. In this embodiment, a case where the vehicle 102 is a two-wheel vehicle will be described as an example.

[Schematic Configuration]

As shown in FIG. 20, the vehicle 102 includes a traction control apparatus 90 and a control unit 60 that generates a control signal for the traction control apparatus 90.

The traction control apparatus 90 includes a hydraulic circuit that applies a braking force to a braking device BR of a drive wheel (typically, rear wheel), an engine control circuit that generates a control command for controlling output of an engine ENG, and the like.

The control unit 60 is mounted on a vehicle body 103. The control unit 60 acquires information relating to the acceleration or angular velocity of the vehicle body in the three-axis directions, which changes from moment to moment, on the basis of the detection signal of the acceleration, angular velocity, or the like acting on the vehicle body 103, generates a control signal for controlling the behavior of the vehicle body 103, and outputs it to the traction control apparatus 90. Note that the control unit 60 may be configured as a part of the traction control apparatus 90.

The control unit 60 is configured to be supplied with output of various sensors such as an acceleration sensor 91, a wheel velocity sensor 92, an angular velocity sensor 93, an accelerator sensor 94, and a brake switch 95.

The acceleration sensor 91 detects accelerations in the three-axis directions (up-and-down direction, front-and-rear direction, and right-and-left direction) including the direction of gravity acting on the vehicle body 103 and the direction orthogonal thereto. The angular velocity sensor 93 is configured to mainly detect the angular velocities of the vehicle body 103 in the roll direction and the yaw direction. In addition thereto, it may be configured to detect also the angular velocity in the pitch direction.

The acceleration sensor 91 and the angular velocity sensor 93 may include a plurality of single-axis sensors having different detection axes, or a multi-axis sensor capable of simultaneously detecting multi-axis directions. Note that the acceleration sensor 91 includes the acceleration sensor device 10 (FIG. 2) described in the first embodiment.

The wheel velocity sensor 92 detects the rotational velocity of a drive wheel. The output of the wheel velocity sensor 92 is used for, for example, calculating the slip ratio of a drive wheel or the velocity of the vehicle body. The accelerator sensor 94 detects the presence of absence of the accelerator (throttle) operation and the amount of operation. The output of the accelerator sensor 94 is referred to by, for example, roll control or the like of the vehicle body at the time of cornering. The brake switch 95 detects the presence or absence of the operation of a brake lever/pedal. The output of the brake switch 95 is referred to by, for example, anti-skid control or drive slip control (traction control) of the drive wheel.

The control unit 60 constitutes the vehicle control apparatus according to this embodiment. However, also the acceleration sensor 91 and the angular velocity sensor 93 may be configured as a part of the vehicle control apparatus. When generating a control command to the traction control apparatus 90, output of each of the wheel velocity sensor 92, the accelerator sensor 94, and the brake switch 95 may be omitted as necessary.

[Vehicle Control Apparatus]

Figure 21:
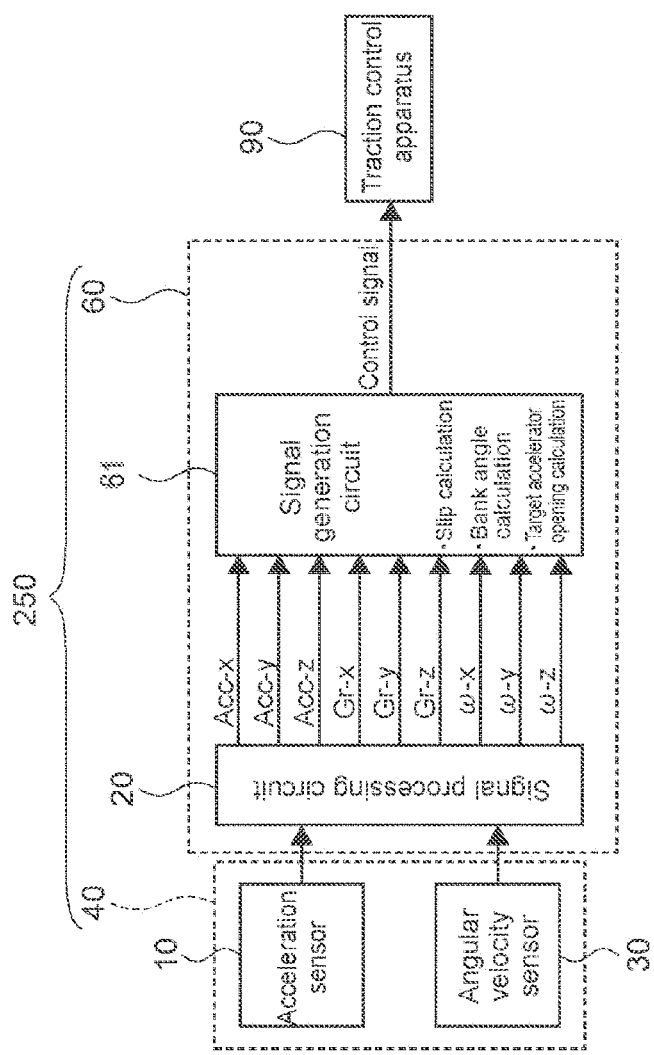
FIG. 21 is a block diagram showing a configuration of the vehicle control apparatus.

Subsequently, details of the vehicle control apparatus will be described. FIG. 21 is a block diagram showing a configuration of a vehicle control apparatus 250 according to this embodiment.

The vehicle control apparatus 250 includes the detection unit 40 and the control unit 60.

The detection unit 40 is configured similarly to that in the first embodiment, and includes the acceleration sensor device 10 and the angular velocity sensor device 30. The acceleration sensor device 10 corresponds to the acceleration sensor 81 in FIG. 1, and detects the accelerations in the three-axis directions (x, y, and z axes in FIG. 3) orthogonal to each other. The angular velocity sensor device 30 corresponds to the angular velocity sensor 83 in FIG. 1, and detects the angular velocities around the above-mentioned three axes.

As described above, the acceleration detection device 10 outputs the first acceleration detection signal and the second acceleration detection signal. The first acceleration detection signal includes information relating to the acceleration acting on the vehicle body 101, and has an alternating current waveform corresponding to the above-mentioned acceleration. The second acceleration detection signal includes information relating to the above-mentioned acceleration, and has an output waveform in which the alternating current component corresponding to the above-mentioned acceleration is superimposed on the direct current component.

The control unit 60 includes the signal processing circuit 20 and a signal generation circuit 61.

The signal processing circuit 20 is configured similarly to that in the first embodiment, and calculates dynamic acceleration components (Acc-x, Acc-y, and Acc-z), static acceleration components (Gr-x, Gr-y, and Gr-z), and angular velocity signals ($\omega$-x, $\omega$-y, and $\omega$-z) of the vehicle body 103 acquired at a predetermined sampling period, on the basis of the output signal of the detection unit 40, and sequentially outputs them to the signal generation circuit 61.

The dynamic acceleration components (Acc-x, Acc-y, and Acc-z) and the static acceleration components (Gr-x, Gr-y, and Gr-z) in the three-axis directions are separated by the signal processing circuit 20 on the basis of the first and second acceleration detection signals output from the acceleration sensor device 10.

The signal processing circuit 20 calculates each of the angular velocity signals ($\omega$-x, $\omega$-y, and $\omega$-z) around the three axes on the basis of the angular velocity detection signals around the three axes of the vehicle body 103 detected by the angular velocity sensor device 30. The angular velocity sensor device 30 detects each of the angular velocities around the x, y, and z axes. As the angular velocity sensor device 30, a vibration type gyro sensor is typically used.

Other than this, a rotation top gyro sensor, a laser ring gyro sensor, a gas rate gyro sensor, or the like may be used.

As shown in FIG. 7, the signal processing circuit 20 includes the difference calculation circuit unit 511. The difference calculation circuit unit 511 calculates the motion acceleration (vertical acceleration or lateral acceleration) acting on the vehicle body 103. In the difference calculation circuit unit 511, the acceleration calculation unit 200 (FIGS. 8 and 9) that extracts each of the dynamic acceleration components (Acc-x, Acc-y, and Acc-z) and the static acceleration components (Gr-x, Gr-y, and Gr-z) from the above-mentioned motion acceleration on the basis of the first acceleration detection signal and the second acceleration detection signal is configured.

The dynamic acceleration component typically refers to the AC component of the acceleration described above, and typically corresponds to a motion acceleration (translational acceleration, centrifugal acceleration, vertical vibration acceleration, etc.) that acts on the vehicle body 103 at the time when the vehicle 102 travels. Meanwhile, the static acceleration component refers to the DC component of the acceleration described above, and typically corresponds to a gravitational acceleration or acceleration estimated to be the gravitational acceleration.

Further, the dynamic acceleration components (Acc-x, Acc-y, and Acc-z) and the static acceleration components (Gr-x, Gr-y, and Gr-z) extracted in the difference calculation circuit unit 511 are input to the signal generation circuit 61. Meanwhile, the angular velocity detection signals ($\omega$-x, $\omega$-y, and $\omega$-z) preprocessed in the preprocessing circuit unit 510c are input to the signal generation circuit 61.

The signal generation circuit 61 typically includes a computer including a CPU/MPU and a memory. The signal generation circuit 61 calculates the posture (bank angle) of the vehicle body 103, the slip ratio of the drive wheel, the target accelerator opening, and the like on the basis of the dynamic acceleration component and the static acceleration component of the vehicle body 103 extracted by the signal processing circuit 20. The signal generation circuit 61 generates a control signal for controlling behavior of the vehicle body 103 on the basis of the output of the signal processing circuit 20, and outputs it to the traction control apparatus 90.

The signal generation circuit 61 compares the input dynamic acceleration components, static acceleration components, and angular velocity components with each other, calculates the motion accelerations of the vehicle body 103 in the bounce direction, roll direction, and pitch direction, the angular velocities of the vehicle body 103 in the roll direction and yaw direction, the inclination angle of the vehicle body 103 with respect to the horizontal direction, and the like, and determines the behavior or posture of the vehicle body 103. Further, by referring to the output of the wheel velocity sensor 92, the accelerator sensor 94, and the brake switch 95, the slip state (slip ratio) of the front and rear wheels to determine the posture of the vehicle body 103. As a result, it is possible to perform proper behavior control of the vehicle body 103 according to the travelling velocity of the vehicle 102. For example, in this embodiment, the signal generation circuit 61 generates a control command that suppresses slipping of the drive wheel or output of the engine ENG so that the determined behavior of the vehicle body 103 becomes desired behavior (e.g., avoiding a slip state), and outputs this command to the traction control unit 90.

The signal generation circuit 61 typically has a plurality of threshold values set in advance in accordance with the magnitude of the dynamic acceleration or angular velocity in each axial direction, and generates a control signal according to the threshold values. The present technology is not limited to discrete (digital) posture control based on the plurality of threshold values, and continuous (analog) posture control according to the detection value may be executed. Further, priority (weighting) may be set to the acceleration detection value in each axial direction in accordance with the control mode, or priority may be set between the acceleration detection value and the angular velocity detection value.

For the motion accelerations in the bounce direction, roll direction, and pitch direction, respectively, the dynamic acceleration component (Acc-z) in the z-axis direction, the dynamic acceleration (Acc-x) in the x-axis direction, and the motion acceleration (Acc-y) in the y-axis direction are mainly referred to. Further, for the angular velocities in the roll direction and yaw direction, respectively, the angular velocity detection signal ($\omega$-y) around the y axis, and the angular velocity detection signal ($\omega$-z) around the z axis are mainly referred to. Further, the inclination angle of the vehicle body 103 with respect to the horizontal direction is calculated from, for example, the gravity (vertical direction) detected on the basis of the static acceleration components (Gr-x, Gr-y, and Gr-z) of the acceleration.

[Effect]

As described above, the vehicle control apparatus 250 according to this embodiment extracts the dynamic acceleration component and static acceleration component in each of the axial directions (x, y, and z-axis directions) from the acceleration acting on the vehicle body 103 on the basis of the first acceleration detection signal and the second acceleration detection signal. As a result, it is possible to perform appropriate behavior control by suppressing leakage of the gravitational acceleration into the motion acceleration in the lateral direction, which is generated at the time of posture change of the vehicle body 103 during cornering.

Figure 22:
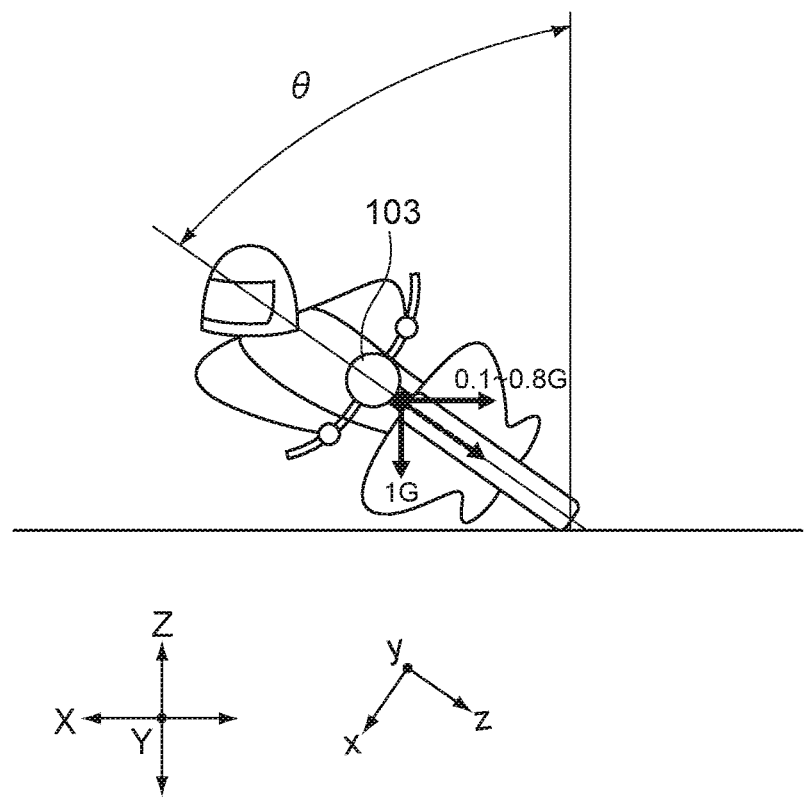
FIG. 22 is a schematic diagram of a vehicle describing an operation of the vehicle control apparatus.

For example, as schematically shown in FIG. 22, in the case where the acceleration sensor is installed in the vehicle body 103 so that the up-and-down direction detection axis (z axis) of the acceleration sensor is in parallel to the vertical axis, the gravitational acceleration leaks into the yaw direction detection axis (x axis) of the acceleration sensor when the vehicle body 103 is inclined with respect to the horizontal plane (xy plane) by cornering.

The leakage of the gravitational acceleration into the yaw direction detection axis leads to a measurement error of a bank angle $\theta$ (inclination angle with respect to the vertical line) of the vehicle body 103, and the amount of leakage differs depending on the characteristics of the acceleration sensor device to be used. For example, the amount of leakage is approximately 350 mG (0.35 G) when the bank angle $\theta$ is 20 degrees, and the amount of leakage increases as the inclination is larger. In the case of a two-wheel vehicle, generally, the maximum G value in the lateral direction at the time of cornering is approximately 0.1 G to 0.8 G. Therefore, an error of approximately 0.35 G occurs therebetween. Then, the vehicle control apparatus using the existing acceleration sensor needs to perform control in anticipation of the amount corresponding to the above-mentioned error. For this reason, for example, it is very difficult to perform appropriate traction control in the control mode in which a slip value that is a threshold value of turning on/off traction control is changed.

Meanwhile, in accordance with this embodiment, since it is configured to extract, from the acceleration in each axial direction detected by the acceleration sensor device 10, a net dynamic acceleration component from which a static acceleration component has been removed, it is possible to detect the motion acceleration in the lateral direction with high precision without being affected by leakage of the gravitational acceleration into the lateral direction detection axis. As a result, even in the case where the bank angle θ of the vehicle body 103 is relatively large, it is possible to measure the accurate posture of the vehicle body and realize appropriate behavior control.

Further, since a piezoelectric acceleration detection device is adopted as a first acceleration detection signal of the acceleration detection device 10, the leakage of the gravitational acceleration is little, and output with no gap limitation and with a wide dynamic range can be achieved. As a result, it is possible to detect the dynamic acceleration with high precision on the basis of the first acceleration detection signal even in the case where roll or pitch is large.

Meanwhile, since a non-piezoelectric acceleration detection device such as a piezoresistive one is employed as the second acceleration detection signal of the acceleration detection device 10, it is possible to detect the inclination (the bank angle θ) of the vehicle body 103 with respect to the horizontal direction with high precision.

As described above, in accordance with this embodiment, since the posture of the vehicle body 103 can be accurately determined by complementing the first acceleration detection signal and the second acceleration detection signal, it is possible to realize behavior control with high precision.

Even though the embodiments of the present technology have been described above, the present technology is not limited only to the above-mentioned embodiments, and various changes can be added.

For example, although a four-wheel vehicle and a two-wheel vehicle have been described as the vehicles 100 and 102 as an example in the above embodiments, the present technology is applicable also to the posture control of one-wheel vehicle.

In addition, even though the acceleration sensor device 10 shown in FIGS. 3 to 5 is used as the acceleration sensor, a configuration is not particularly limited as long as accelerations in the three axis directions can be detected. Similarly, a calculation method for extracting the dynamic acceleration component and the static acceleration component from the acceleration acting on the sensor device is not limited to the above-described example, and an appropriate calculation method can be adopted.

Further, in the above embodiments, the first acceleration detection signals (Acc-AC-x, Acc-AC-y, and Acc-AC-z) and the second acceleration detection signals (Acc-DC-x, Acc-DC-y, and Acc-DC-z) are acquired from the same sensor device. However, the present technology is not limited thereto, and a sensor device that outputs each detection signal may be configured as a separate sensor device.

It should be noted that the present technology may take the following configurations.

(1) A vehicle control apparatus, including:
a control unit that generates a control signal for controlling behavior of a vehicle body on a basis of a first acceleration detection signal and a second acceleration detection signal, the first acceleration detection signal including information relating to an acceleration acting on the vehicle body, the first acceleration detection signal having an alternating current waveform corresponding to the acceleration, the second acceleration detection signal including information relating to the acceleration, the second acceleration detection signal having an output waveform, an alternating current component corresponding to the acceleration being superimposed on a direct current component in the output waveform.

(2) The vehicle control apparatus according to (1) above, in which
the control unit includes
an acceleration calculation unit that extracts a dynamic acceleration component and a static acceleration component acting on the vehicle body on a basis of the first acceleration detection signal and the second acceleration detection signal, and
a signal generation circuit that generates the control signal on a basis of an angular velocity signal, the dynamic acceleration component, and the static acceleration component, the angular velocity signal including information relating to at least one of an angular velocity in a roll direction acting on the vehicle body or an angular velocity in a pitch direction acting on the vehicle body.

(3) The vehicle control apparatus according to (2) above, in which
the signal generation circuit outputs, as the control signal, a control command to a suspension control apparatus that suppresses a posture change of the vehicle body.

(4) The vehicle control apparatus according to (2) above, in which
the signal generation circuit outputs, as the control signal, a control command to a traction control apparatus that controls driving force of a drive wheel.

(5) The vehicle control apparatus according to any one of (1) to (4), in which
the acceleration calculation unit includes a calculation circuit that extracts the static acceleration component from the acceleration on a basis of a difference signal between the first acceleration detection signal and the second acceleration detection signal.

(6) The vehicle control apparatus according to (5) above, in which
the acceleration calculation unit further includes a gain adjustment circuit that adjusts gain of each signal so that the first acceleration detection signal and the second acceleration detection signal are at the same level.

(7) The vehicle control apparatus according to (5) or (6) above, in which
the acceleration calculation unit further includes a correction circuit that computes a correction coefficient on a basis of the difference signal and corrects one of the first acceleration detection signal and the second acceleration detection signal using the correction coefficient.

(8) The vehicle control apparatus according to any one of (1) to (7), further including
a detection unit including a movable portion, a piezoelectric first acceleration detection unit, and a non-piezoelectric second acceleration detection unit, the movable portion being movable upon receiving an acceleration, the piezoelectric first acceleration detection unit being provided on the movable portion to output the first acceleration detection signal, the non-piezoelectric second acceleration detection unit being provided on the movable portion to output the second acceleration detection signal.

(9) The vehicle control apparatus according to (8) above, in which
the second acceleration detection unit includes a piezoresistive acceleration detection device.

(10) The vehicle control apparatus according to (8) above, in which
the second acceleration detection unit includes a capacitive acceleration detection device.

REFERENCE SIGNS LIST 10 acceleration sensor device
11 first acceleration detection unit 12 second acceleration detection unit
20 signal processing circuit
30 angular velocity sensor device
40 detection unit
50, 60 control unit
51, 61 signal generation circuit
80 suspension control apparatus
90 traction control apparatus
100, 102 vehicle
101, 103 vehicle body
150, 250 vehicle control apparatus
200 acceleration calculation unit
300 angular velocity calculation unit
511 difference calculation circuit unit

The invention claimed is:

1. A vehicle control apparatus, comprising:
at least one sensor configured to detect a first acceleration detection signal and a second acceleration detection signal, wherein
the first acceleration detection signal includes information related to an acceleration of a vehicle body,
the first acceleration detection signal has an alternating current waveform corresponding to the acceleration,
the second acceleration detection signal includes information related to the acceleration, and
the second acceleration detection signal has an output waveform in which an alternating current component corresponding to the acceleration is superimposed on a direct current component; and
circuitry configured to:
acquire a rotational velocity of a drive wheel of the vehicle body;
calculate a slip ratio of the drive wheel based on the acquired rotational velocity of the drive wheel;
determine an inclination angle of the vehicle body with respect to a horizontal direction based on the first acceleration detection signal and the second acceleration detection signal;
determine one of a behavior or a posture of the vehicle body based on the calculated slip ratio and the determined inclination angle;
generate a control signal based on the determined one of the behavior or the posture; and
output the generated control signal to a traction control apparatus, wherein the traction control apparatus controls a drive force of the drive wheel based on the outputted control signal.

2. The vehicle control apparatus according to claim 1, wherein the circuitry is further configured to:
extract a dynamic acceleration component and a static acceleration component of the vehicle body based on the first acceleration detection signal and the second acceleration detection signal; and
generate the control signal based on an angular velocity signal of the vehicle body, the dynamic acceleration component, and the static acceleration component, wherein
the angular velocity signal includes information related to at least one of an angular velocity in a roll direction of the vehicle body or an angular velocity in a pitch direction of the vehicle body.

3. The vehicle control apparatus according to claim 2, wherein the circuitry is further configured to extract the static acceleration component based on a difference signal between the first acceleration detection signal and the second acceleration detection signal.

4. The vehicle control apparatus according to claim 3, wherein
the circuitry is further configured to adjust gain of each of the first acceleration detection signal and the second acceleration detection signal, and
the first acceleration detection signal and the second acceleration detection signal are at a same level based on the adjusted gain.

5. The vehicle control apparatus according to claim 3, wherein the circuitry is further configured to:
calculate a correction coefficient based on the difference signal; and
correct one of the first acceleration detection signal or the second acceleration detection signal based on the correction coefficient.

6. The vehicle control apparatus according to claim 3, wherein
the at least one sensor includes a movable portion, a piezoelectric acceleration sensor, and a non-piezoelectric acceleration sensor,
the movable portion is movable based on the acceleration,
the piezoelectric acceleration sensor is on the movable portion and configured to output the first acceleration detection signal, and
the non-piezoelectric acceleration sensor is on the movable portion and configured to output the second acceleration detection signal.

7. The vehicle control apparatus according to claim 6, wherein the non-piezoelectric acceleration sensor includes a piezoresistive acceleration detection device.

8. The vehicle control apparatus according to claim 6, wherein the non-piezoelectric acceleration sensor includes a capacitive acceleration detection device.

9. The vehicle control apparatus according to claim 1, wherein the circuitry is further configured to:
compute a motion acceleration that acts on the vehicle body, wherein the motion acceleration includes at least one of a vertical acceleration or a lateral acceleration;
extract a plurality of dynamic acceleration components and a plurality of static acceleration components from the computed motion acceleration based on the first acceleration detection signal and the second acceleration detection signal; and
determine the inclination angle of the vehicle body based on a comparison between the plurality of dynamic acceleration components and the plurality of static acceleration components.

10. The vehicle control apparatus according to claim 9, wherein
each of the plurality of static acceleration components corresponds to a gravitational acceleration, and
each of the plurality of dynamic acceleration components corresponds to one of a translational acceleration, a centrifugal acceleration, or a vertical vibration acceleration that acts on the vehicle body.

* * * * *